(12) United States Patent
Woytowitz et al.

(10) Patent No.: US 8,660,705 B2
(45) Date of Patent: Feb. 25, 2014

(54) IRRIGATION SYSTEM WITH SOIL MOISTURE BASED SEASONAL WATERING ADJUSTMENT

(75) Inventors: Peter J. Woytowitz, San Diego, CA (US); Jeffery J. Kremicki, Cardiff by the Sea, CA (US); LaMonte D. Porter, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 135 days.

(21) Appl. No.: 13/154,253

(22) Filed: Jun. 6, 2011

(65) Prior Publication Data

US 2011/0238229 A1  Sep. 29, 2011

Related U.S. Application Data

(63) Continuation of application No. 12/251,179, filed on Oct. 14, 2008, now abandoned, and a continuation-in-part of application No. 13/011,301, filed on Jan. 21, 2011, now Pat. No. 8,548,632, which is a continuation of application No. 12/176,936, filed on Jul. 21, 2008, now Pat. No. 7,877,168, which is a continuation-in-part of application No. 10/985,425, filed on Nov. 9, 2004, now Pat. No. 7,853,363, and a continuation-in-part of application No. 11/288,831, filed on Nov. 29, 2005, now Pat. No. 7,412,303.

(51) Int. Cl.
*G05D 7/00* (2006.01)

(52) U.S. Cl.
USPC ............... 700/284; 239/63; 239/64; 137/78.3

(58) Field of Classification Search
USPC ........................ 700/282–284; 239/64, 67, 69; 137/78.1–78.3
See application file for complete search history.

(56) References Cited

U.S. PATENT DOCUMENTS

| 4,180,083 A | 12/1979 | Miyaoka et al. |
| 4,646,224 A | 2/1987 | Ransburg et al. |

(Continued)

FOREIGN PATENT DOCUMENTS

| JP | WO 2008/144563 | 11/2008 | |
| WO | WO 03085473 A1 | 10/2003 | ............. G05D 11/00 |

OTHER PUBLICATIONS

Aqua Conserve Products from Internet—Email address: http://www.aquaconserve.com/products.php (2002, Aqua Conservation Systems), in 5 pages.

(Continued)

*Primary Examiner* — Mohammad Ali
*Assistant Examiner* — Nathan Laughlin
(74) *Attorney, Agent, or Firm* — Knobbe, Martens, Olson & Bear, LLP

(57) ABSTRACT

A soil moisture based irrigation system includes a stand alone irrigation controller with a seasonal adjust feature and a stand alone weather station including at least one soil moisture sensor. The soil moisture based irrigation system further includes a stand alone soil moisture control unit operatively connected to the irrigation controller and the soil moisture sensor. The soil moisture control unit includes programming configured to calculate an estimated soil moisture requirement value using a signal from the soil moisture sensor and to automatically modify a watering schedule of the irrigation controller through the seasonal adjust feature based on the estimated soil moisture requirement value to thereby conserve water while maintaining plant health.

26 Claims, 40 Drawing Sheets

(56) References Cited

U.S. PATENT DOCUMENTS

| | | | |
|---|---|---|---|
| 4,693,419 A | 9/1987 | Weintraub et al. | |
| 4,722,478 A | 2/1988 | Fletcher et al. | |
| 4,807,664 A | 2/1989 | Wilson et al. | |
| 4,811,221 A | 3/1989 | Sturman et al. | |
| 4,922,433 A | 5/1990 | Mark | |
| 4,937,732 A | 6/1990 | Brundisini | |
| 5,097,861 A | 3/1992 | Hopkins et al. | |
| 5,148,826 A * | 9/1992 | Bakhshaei | 137/80 |
| 5,148,985 A | 9/1992 | Bancroft | |
| 5,173,855 A | 12/1992 | Nielsen et al. | |
| 5,208,855 A | 5/1993 | Marian | |
| 5,229,937 A | 7/1993 | Evelyn-Veere | |
| 5,251,153 A | 10/1993 | Nielsen et al. | |
| 5,293,554 A | 3/1994 | Nicholson | |
| 5,337,957 A | 8/1994 | Olson | |
| 5,381,331 A | 1/1995 | Mock et al. | |
| 5,444,611 A * | 8/1995 | Woytowitz et al. | 700/16 |
| 5,546,974 A | 8/1996 | Bireley | |
| 5,694,963 A | 12/1997 | Fredell et al. | |
| 5,696,671 A | 12/1997 | Oliver | |
| 5,740,038 A | 4/1998 | Hergert | |
| 5,829,678 A | 11/1998 | Hunter et al. | |
| 5,836,339 A | 11/1998 | Klever et al. | |
| 5,870,302 A | 2/1999 | Oliver | |
| 5,944,444 A | 8/1999 | Motz et al. | |
| 6,016,971 A | 1/2000 | Welch et al. | |
| 6,088,621 A | 7/2000 | Woytowitz et al. | |
| 6,145,755 A | 11/2000 | Feltz | |
| 6,227,220 B1 | 5/2001 | Addink | |
| 6,267,298 B1 * | 7/2001 | Campbell | 239/70 |
| 6,298,285 B1 | 10/2001 | Addink et al. | |
| 6,314,340 B1 | 11/2001 | Mecham et al. | |
| 6,452,499 B1 | 9/2002 | Runge et al. | |
| 6,453,215 B1 | 9/2002 | Lavole | |
| 6,453,216 B1 | 9/2002 | McCabe et al. | |
| 6,568,416 B2 | 5/2003 | Tucker et al. | |
| 6,570,109 B2 | 5/2003 | Klinefelter et al. | |
| 6,721,630 B1 | 4/2004 | Woytowitz | |
| 6,782,311 B2 | 8/2004 | Barlow et al. | |
| 6,823,239 B2 | 11/2004 | Sieminski | |
| 6,842,667 B2 | 1/2005 | Beutler et al. | |
| 6,892,114 B1 | 5/2005 | Addink et al. | |
| 6,895,987 B2 | 5/2005 | Addink et al. | |
| 6,947,811 B2 | 9/2005 | Addink et al. | |
| 6,977,351 B1 | 12/2005 | Woytowitz | |
| 6,993,416 B2 | 1/2006 | Christiansen | |
| 7,010,394 B1 | 3/2006 | Runge et al. | |
| 7,048,204 B1 | 5/2006 | Addink et al. | |
| 7,058,478 B2 | 6/2006 | Alexanian | |
| 7,069,115 B1 | 6/2006 | Woytowitz | |
| 7,133,749 B2 | 11/2006 | Goldberg | |
| 7,146,254 B1 | 12/2006 | Howard | |
| 7,168,632 B2 | 1/2007 | Kates | |
| 7,203,576 B1 | 4/2007 | Wilson et al. | |
| 7,225,058 B1 | 5/2007 | Porter | |
| 7,245,991 B1 | 7/2007 | Woytowitz | |
| 7,261,245 B2 | 8/2007 | Zur | |
| 7,289,886 B1 | 10/2007 | Woytowitz | |
| 7,403,840 B2 | 7/2008 | Moore et al. | |
| 7,412,303 B1 | 8/2008 | Porter et al. | |
| 7,430,458 B2 | 9/2008 | Dansereau et al. | |
| 7,458,521 B2 | 12/2008 | Ivans | |
| 7,477,950 B2 | 1/2009 | DeBourke et al. | |
| 7,532,954 B2 | 5/2009 | Evelyn-Veere | |
| 7,596,429 B2 | 9/2009 | Cardinal et al. | 700/284 |
| 7,619,322 B2 | 11/2009 | Gardner et al. | |
| 7,789,321 B2 | 9/2010 | Hitt | |
| 7,805,221 B2 | 9/2010 | Nickerson | |
| 7,853,363 B1 | 12/2010 | Porter et al. | |
| 7,877,168 B1 | 1/2011 | Porter et al. | |
| 7,953,517 B1 | 5/2011 | Porter et al. | |
| 7,956,624 B2 | 6/2011 | Beaulieu | |
| 8,301,309 B1 | 10/2012 | Woytoxitz et al. | |
| 2002/0002425 A1 | 1/2002 | Dossey et al. | |
| 2002/0072829 A1 | 6/2002 | Addink et al. | |
| 2003/0093159 A1 | 5/2003 | Sieminski | |
| 2003/0109964 A1 | 6/2003 | Addink et al. | |
| 2003/0179102 A1 | 9/2003 | Barnes | |
| 2003/0182022 A1 | 9/2003 | Addink et al. | |
| 2004/0011880 A1 | 1/2004 | Addink et al. | |
| 2004/0015270 A1 | 1/2004 | Addink et al. | |
| 2004/0030456 A1 | 2/2004 | Barlow et al. | |
| 2004/0039489 A1 | 2/2004 | Moore et al. | |
| 2004/0181315 A1 | 9/2004 | Cardinal et al. | |
| 2004/0206395 A1 | 10/2004 | Addink et al. | |
| 2005/0038569 A1 | 2/2005 | Howard | |
| 2005/0125083 A1 | 6/2005 | Kiko | |
| 2005/0199842 A1 | 9/2005 | Parsons et al. | |
| 2005/0203669 A1 * | 9/2005 | Curren | 700/284 |
| 2005/0211791 A1 | 9/2005 | Clark et al. | |
| 2005/0211792 A1 | 9/2005 | Clark et al. | |
| 2005/0211793 A1 | 9/2005 | Clark et al. | |
| 2005/0211794 A1 | 9/2005 | Clark et al. | |
| 2005/0216127 A1 | 9/2005 | Clark et al. | |
| 2005/0216128 A1 | 9/2005 | Clark et al. | |
| 2005/0216129 A1 | 9/2005 | Clark et al. | |
| 2005/0216130 A1 | 9/2005 | Clark et al. | |
| 2006/0116792 A1 | 6/2006 | Addink | |
| 2006/0122736 A1 | 6/2006 | Alexanian | |
| 2006/0161309 A1 | 7/2006 | Moore et al. | |
| 2006/0184284 A1 | 8/2006 | Froman et al. | |
| 2006/0184285 A1 | 8/2006 | Evelyn-Veere | |
| 2007/0016334 A1 | 1/2007 | Smith et al. | |
| 2007/0055407 A1 | 3/2007 | Goldberg et al. | |
| 2007/0156290 A1 | 7/2007 | Froman et al. | |
| 2007/0237583 A1 | 10/2007 | Corwon et al. | |
| 2007/0293990 A1 | 12/2007 | Alexanain | |
| 2008/0091307 A1 | 4/2008 | Dansereau et al. | |
| 2008/0142614 A1 | 6/2008 | Elezaby | |
| 2009/0094097 A1 | 4/2009 | Gartenswartz | |
| 2009/0099701 A1 | 4/2009 | Li et al. | |
| 2009/0138105 A1 | 5/2009 | Crawford | |
| 2009/0177330 A1 | 7/2009 | Kah, Jr. | 700/284 |
| 2009/0216345 A1 | 8/2009 | Christfort | |
| 2009/0326723 A1 | 12/2009 | Moore et al. | |
| 2010/0030476 A1 | 2/2010 | Woytowitz et al. | |
| 2010/0094472 A1 | 4/2010 | Woytowitz et al. | |
| 2010/0312404 A1 | 12/2010 | Nickerson | |
| 2011/0093123 A1 | 4/2011 | Alexanian | |
| 2011/0224836 A1 | 9/2011 | Hern et al. | |
| 2011/0238228 A1 | 9/2011 | Woytowitz et al. | |

OTHER PUBLICATIONS

Crop Evapotranspiration-Guidelines for Computing Crop Water Requirements-FAQ Irrigation and Drainage Paper 56 Attachment for link to Internet-Email address: http://hydrotechnic.150m.com/crop_water.html (no date) 60 pages.

Dukes, et al.: "Soil Moisture Sensor Control for Conservation of Landscape Irrigation," Georgia Water Resources Conference, Mar. 27-29, 2007.

East Bay Municipal Utility District (EBMUD), "Irrigation Controllers Timer for the Homeowner," US Environmental Protection Agency (EPA) (EPA 832-K-03-001, Jul. 2003)—http://www.epa.gov/owm/water-efficiency/Irrigation_booklet.pdf.

Hunter Irrigation Products Catalog, 110 pages, 2007.

Hydropoint, Inc., WeatherTRAK, Smart Irrigation Made Simple, in 1 page. 2004 Hydropoint, Inc. http://www.hydropoint.com (2004 Hydropoint, Inc.).

Residential Landscape Irrigation Study Using Aqua ET Controllers for Aqua Conserve, Denver Water, Denver, CO & City of Sonoma, CA & Valley of the Moon Water District, CA. Jun. 2002, in 5 pages.

Shedd et al., "Evaluation of Evapotranspiration and Soil Moisture-based Irrigation Control on Turfgrass," Proceedings ASCE EWRI World Environmental & Water Resources Congress, May 15-19, 2007, in 21 pages.

SRR Remote Wiring and Installation of Hunter the Irrigation Innovators from Internet—Email address: http:///www.hunterindustries.com/resources/technical_bulletin/srr_remote.html (2004 Hunter Industries Incorporated), in 1 page.

(56) References Cited

OTHER PUBLICATIONS

Toro Partners with HydroPoint Data Systems to Develop Weather-Based Irrigation Controllers of Athletic Turf News from Internet—Email address: http://athleticturf.net/athleticturf/article, Jan. 16, 2004.

U.S. Appl. No. 10/985,425 "Amendment" in response to USPTO Office Action mailed on Aug. 11, 2005 in 9 pages.

U.S. Appl. No. 10/985,425 "Amendment" in response to USPTO Office Action mailed Dec. 6, 2005 in 8 pages.

U.S. Appl. No. 10/985,425 "Brief on Appeal" in response to Board of Appeals and Interferences' Notice of Panel Decision from Pre-Appeal Brief Review mailed Jan. 23, 2007 (appealing from USPTO Office Action mailed Mar. 24, 2006).

U.S. Appl. No. 10/985,425 "Examiner's Answer" in response to Appellants' Appeal Brief filed Mar. 23, 2007 (appealing from USPTO Office Action mailed on Mar. 24, 2006).

U.S. Appl. No. 10/985,425 "Reply Brief" in response to Examiner's Answer from Board of Appeals and Interferences mailed Jul. 25, 2007.

* cited by examiner

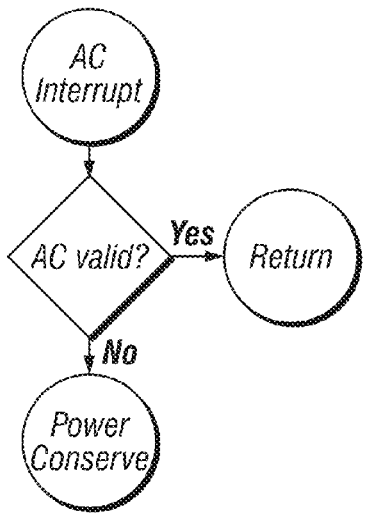
*FIG. 11A*
*FIG. 11B*
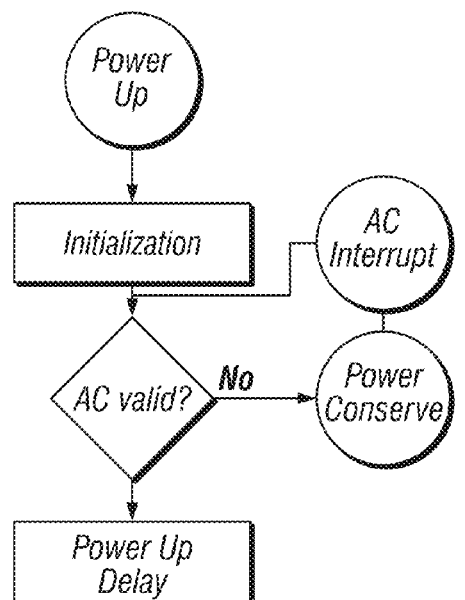
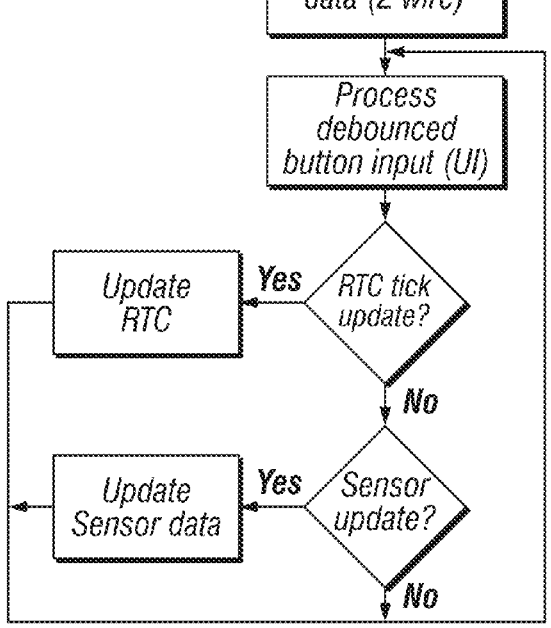
*FIG. 11C*
*FIG. 11D*

IRRIGATION SYSTEM WITH SOIL MOISTURE BASED SEASONAL WATERING ADJUSTMENT

CROSS REFERENCE TO RELATED APPLICATIONS

This application is a continuation of similarly titled U.S. patent application Ser. No. 12/251,179 of Peter J. Woytowitz et al. filed Oct. 14, 2008. This application is also a continuation-in-part of U.S. Ser. No. 13/011,301 of Porter et al., filed Jan. 21, 2011, which is a continuation of U.S. Ser. No. 12/176,936 of Porter et al. filed Jul. 21, 2008, now U.S. Pat. No. 7,877,168 granted Jan 25, 2011. Said U.S. Ser. No. 12/176,936 is a continuation-in-part of U.S. Ser. No. 10/985,425 of Woytowitz et al., filed Nov. 9, 2004, now U.S. Pat. No. 7,853,363 granted Dec. 14, 2010, and a continuation-in-part of U.S. Ser. No. 11/288,831 of Porter et al., filed Nov. 29, 2005, now U.S. Pat. No. 7,412,303 granted Aug. 12, 2008. Priority is claimed off of the filing dates of each of the above-identified applications and patents, and the entire disclosures of each of the above-identified applications and patents are hereby incorporated by reference.

FIELD OF THE INVENTION

The present invention relates to residential and commercial irrigation systems, and more particularly to irrigation controllers that use soil moisture data in calculating and executing watering schedules.

BACKGROUND OF THE INVENTION

Electronic irrigation controllers have long been used on residential and commercial sites to water turf and landscaping. They typically comprise a plastic housing that encloses circuitry including a processor that executes a watering program. Watering schedules are typically manually entered or selected by a user with pushbutton and/or rotary controls while observing an LCD display. The processor turns a plurality of solenoid actuated valves ON and OFF with solid state.

A conventional irrigation controller of the type that is used in the commercial market typically includes a seasonal adjustment feature. This feature is typically a simple global adjustment implemented by the user that adjusts the overall watering as a percentage of the originally scheduled cycle times. It is common for the seasonal adjustment to vary between a range of about ten percent to about one hundred and fifty percent or more of the scheduled watering. This is the simplest and most common overall watering adjustment that users of irrigation controllers can effectuate. Users can move the amount of adjustment down to ten to thirty percent in the winter, depending on their local requirements. They may run the system at fifty percent during the spring or fall seasons, and then at one hundred percent for the summer. The ability to seasonally adjust up to one hundred and fifty percent or more of the scheduled watering accommodates the occasional heat wave when turf and landscaping require significantly increased watering. The seasonal adjustment feature does not produce the optimum watering schedules because it does not take into consideration the amount of moisture that is actually available in the soil for the plants to utilize for healthy growth. Instead, the seasonal adjustment feature is manually set to simply adjust the watering schedules globally to run a longer or shorter period of time based on the existing watering schedule. When the seasonal adjustment feature is accurately re-set on a regular basis, a substantial amount of water is conserved while still providing adequate irrigation in a variety of weather conditions. The problem is that most users do not re-set it on a regular basis, or do not set it correctly, so a considerable amount of water is still wasted, or turf and landscaping die.

In the past, irrigation controllers used with turf and landscaping have used Soil moisture data to activate or deactivate irrigation zones based on actual soil moisture conditions. When soil moisture sensors are used with conventional irrigation controllers the sensors typically interrupt the programmed irrigation cycle by breaking the electrical connection between the controller and the irrigation valves when the soil is moist. Some specialized controllers that are designed to work specifically with soil moisture sensors can turn the irrigation on when the soil reaches a dry state, then turns the controller off when it reaches a moist state.

While conventional soil moisture based controllers help to conserve water and maintain plant health over a wide range of weather conditions they are specialized to the soil moisture sensor control and may not meet other needs of the landscaped area well. Soil moisture sensors that are hooked up to traditional irrigation controllers may simply disrupt the scheduled irrigation by disconnecting the common line to the valves when the soil is moist. In these cases, the irrigation controller turns on the outputs to the valves when they are normally scheduled to run. If the soil moisture sensor is sensing moist soil conditions, it simply disconnects the electrical circuit to the valve. The controller thinks it is irrigating, but the irrigation process is not happening. This can create confusion for the user when they go to the controller and see that station (X) is on yet they go out to the property to see that the same station is not running irrigation. This can result in calls to professionals to debug the system when the soil moisture was just keeping the station from running as designed. In these applications, there is no indication on the controller that the soil moisture has disrupted the irrigation process. In both of the above circumstances, the systems may require one sensor to be placed in the ground for every zone on the controller. Cables are then run back to the controller through the landscape. Some irrigation controllers, such as the ACC controller from Hunter Industries, can control forty-eight zones of irrigation. This requires up to forty-eight sensors to be placed in the ground with forty-eight cables buried throughout the landscape area and run back to the controller. This requires a substantial cost in materials and labor. Additionally, some conventional irrigation controllers may calculate the amount of water used based on the irrigation cycles as they run. When the sensors disrupt irrigation, while the controller thinks it is irrigating, the controller creates erroneous reports of over use of water, when in fact conservation is occurring. In some irrigation controllers, the controller knows the theoretical amount of water scheduled to be applied. As the stations are running, the controller measures this theoretical flow against the actual flow with a flow meter installed on the irrigation site. When the theoretical and actual flow is not within certain parameters, an alarm will indicate that there is a problem with the irrigation system. Soil moisture installations mentioned above will not work with these types of controllers. Another application is where one soil moisture sensor is hooked up to a rain sensor port on the conventional type of irrigation controller. In this case, as soon as the sensor senses moisture, it shuts the entire controller off. This requires very abnormal programming in the controller and also requires the sensor to be placed in the last station to be run so the irrigation does not shut off before all stations have irrigated. With this arrangement, the programming of the controller is very important as all of the previous stations may have run too much water for proper irrigation to have occurred prior to the last station sensing that the soil is moist after just a few minutes of irrigation.

SUMMARY OF THE INVENTION

The system of the present invention may take the form of stand alone irrigation controller connected to a standalone soil moisture control unit that is connectable to a soil moisture sensor. Alternatively, the system may take the form of a stand alone irrigation controller with a removable soil moisture control module that is connectable to a soil moisture sensor. In yet another embodiment, the system may take the form of a standalone soil moisture based irrigation controller with all the components mounted in a single box-like housing that is connectable to a soil moisture sensor In accordance with one aspect of the present invention a soil moisture based irrigation system includes a stand alone irrigation controller with a seasonal adjust feature and a soil moisture sensor. The soil moisture based irrigation system further includes a standalone soil moisture control unit operatively connected to the irrigation controller and the soil moisture sensor. The soil moisture control unit includes programming configured to calculate an estimated soil moisture requirement value using a signal from the soil moisture sensor and to automatically modify a watering schedule of the irrigation controller through the seasonal adjust feature based on the estimated soil moisture requirement value to thereby conserve water while maintaining plant health.

In accordance with another aspect of the present invention a soil moisture based irrigation system includes an interface that enables a user to select and/or enter a watering schedule and a memory for storing the watering schedule. The system further includes at least one sensor for generating a signal representative of the soil moisture. A processor is included in the system that is capable of calculating an estimated soil moisture requirement value based at least in part on the signal from the sensor. The system further includes a program executable by the processor to enable the processor to generate commands for selectively turning a plurality of valves ON and OFF in accordance with the watering schedule. The program includes a seasonal adjust feature that provides the capability for automatically modifying the watering schedule based on the estimated soil moisture requirement value to thereby conserve water while maintaining plant health.

The present invention also provides a unique method of controlling a plurality of valves on an irrigation site using soil moisture data. The method includes the step of calculating an estimated soil moisture requirement value based in part on a signal from a soil moisture sensor. The method further includes the step of automatically modifying a watering schedule based on the estimated soil moisture requirement value using a seasonal adjust algorithm to thereby conserve water while maintaining the health of plants on the irrigation site. Optionally, the method of present invention may further include the step of inputting an overall watering adjustment and automatically modifying the watering schedule through the seasonal adjust algorithm based on the estimated soil moisture value as increased or decreased by the inputted overall watering adjustment.

BRIEF DESCRIPTION OF THE DRAWINGS

FIGS. 11A-11D are flow diagrams illustrating the operation of the stand alone soil moisture control unit of FIG. 9.

DETAILED DESCRIPTION

Figure 1:
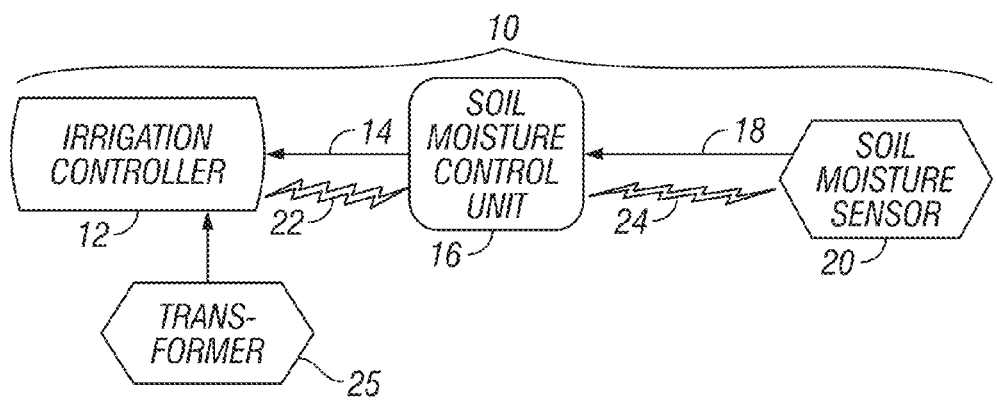
FIG. 1 is a simplified block diagram of an irrigation system in accordance with an embodiment of the present invention.

The entire disclosures of the following U.S. patents and U.S. patent applications are hereby incorporated by reference: U.S. Pat. No. 5,097,861 granted Mar. 24, 1992 of Hopkins et al. entitled IRRIGATION METHOD AND CONTROL SYSTEM; U.S. Pat. No. 5,444,611 granted Aug. 22, 1995 of Peter J. Woytowitz, et al. entitled LAWN AND GARDEN IRRIGATION CONTROLLER; U.S. Pat. No. 5,829,678 granted Nov. 3, 1998 of Richard E. Hunter et al. entitled SELF-CLEANING IRRIGATION REGULATOR VALVE APPARATUS; U.S. Pat. No. 6,088,621 granted Jul. 11, 2000 also of Peter J. Woytowitz et al. entitled PORTABLE APPARATUS FOR RAPID REPROGRAMMING OF IRRIGATION CONTROLLERS; U.S. Pat. No. 6,721,630 granted Apr. 13, 2004 also of Peter J. Woytowitz entitled EXPANDABLE IRRIGATION CONTROLLER WITH OPTIONAL HIGH-DENSITY STATION MODULE; U.S. Pat. No. 6,842,667 granted Jan. 11, 2005 of Beutler et al. entitled POSITIVE STATION MODULE LOCKING MECHANISM FOR EXPANDABLE IRRIGATION CONTROLLER; U.S. patent application Ser. No. 10/883,283 filed Jun. 30, 2004 also of Peter J. Woytowitz entitled HYBRID MODULAR/DECODER IRRIGATION CONTROLLER, now U.S. Pat. No. 7,069,115 granted Jun. 27, 2007; pending U.S. patent application Ser. No. 10/985,425 filed Nov. 9, 2004 also of Peter J. Woytowitz et al. and entitled EVAPOTRANSPIRATION UNIT CONNECTABLE TO IRRIGATION CONTROLLER; pending U.S. patent application Ser. No. 11/288,831 filed Nov. 29, 2005 of LaMonte D. Porter et al. and entitled EVAPOTRANSPIRATION UNIT FOR RE-PROGRAMMING AN IRRIGATION CONTROLLER; U.S. patent application Ser. No. 11/045,527 filed Jan. 28, 2005 also of Peter J. Woytowitz entitled DISTRIBUTED ARCHITECTURE IRRIGATION CONTROLLER, now U.S. Pat. No. 7,245,991 granted Jul. 17, 2007; U.S. Pat. No. 7,289,886 of Peter J. Woytowitz granted Oct. 30, 2007 entitled MODULAR IRRIGATION CONTROLLER WITH SEPARATE FIELD VALVE LINE WIRING TERMINALS; U.S. Pat. No. 7,225,058 of Lamonte D. Porter granted May 29, 2007 entitled MODULAR IRRIGATION CONTROLLER WITH INDIRECTLY POWERED STATION MODULES; pending U.S. patent application Ser. No. 11/458,551 filed Jul. 19, 2006 of Lamonte D. Porter et al. entitled IRRIGATION CONTROLLER WITH INTERCHANGEABLE CONTROL PANEL; pending U.S. patent application Ser. No. 12/042,301 filed Mar. 4, 2008 of Peter J. Woytowitz et al. entitled IRRIGATION CONTROLLER WITH SELECTABLE WATERING RESTRICTIONS, and pending U.S. patent application Ser. No. 12/181,894 filed Jul. 29, 2008 of Peter J. Woytowitz et al. entitled IRRIGATION SYSTEM WITH ET BASED SEASONAL WATERING ADJUSTMENT. The aforementioned U.S. patents and applications are all assigned to Hunter Industries, Inc., the assignee of the subject application.

The present invention addresses the poor inner-operability between soil moisture sensors and conventional irrigation controllers as well as the ability for a moisture sensor control unit to automatically increase or decrease the programmed duration of the irrigation schedule. The irrigation system of the present invention has a familiar manner of entering, selecting and modifying its watering schedules, and either built-in or add-on capability to automatically modify its watering schedules based on soil moisture data in order to conserve water and effectively irrigate vegetation throughout the year as weather conditions vary. The user friendly irrigation system of the present invention is capable of saving a significant amount of water that can theoretically be conserved on a given irrigation site, but is still able to be used by most non-professionals because of the simplicity of the connections between the soil moisture sensor and the controller as well as the clear indication of when irrigation is or is not happening for the user. With the new invention, the moisture sensor indicates what level of moisture is in the soil. The soil moisture control unit calculates the percentage of irrigation schedule that is required for the next irrigation cycle. The Irrigation controller then calculates the watering requirements and controls the irrigation process.

Referring to FIG. 1, in accordance with an embodiment of the present invention, an irrigation system 10 comprises a stand alone irrigation controller 12 connected via cable 14 to a stand alone soil moisture control unit 16 that is in turn connected via cable 18 to a soil moisture sensor 20. The controller 12 and soil moisture control unit 16 would typically be mounted in a garage or other protected location, although they can have a waterproof construction that allows them to be mounted out of doors. The soil moisture sensor 20 is typically mounted in the ground at a place that represents the typical moisture content of the irrigated area. The cables 14 and 18 typically include copper wires so that power can be supplied to the soil moisture control unit 16 and the soil moisture sensor 20 from the irrigation controller 12. Data and commands are sent on other copper wires in the cables. Fiber optic cables can also be utilized for sending data and commands. The controller 12, soil moisture unit 16 and soil moisture sensor 20 may exchange data and commands via wireless communication links 22 and 24. A transformer 25 that plugs into a standard household 110 volt AC duplex outlet supplies twenty-four volt AC power to the stand alone irrigation controller 12. In its preferred form, the irrigation system 10 employs a hard wired communication link 14 between the stand alone irrigation controller 12 and the stand alone soil moisture control unit 16 that are normally mounted adjacent one another, such as on a garage wall, and a hard wired communication link 24 between the stand alone soil moisture control unit 16 and the soil moisture sensor 20. The soil moisture control unit 16 may be manufactured small enough to fit inside the open space of the irrigation controller 12.

Figure 2:
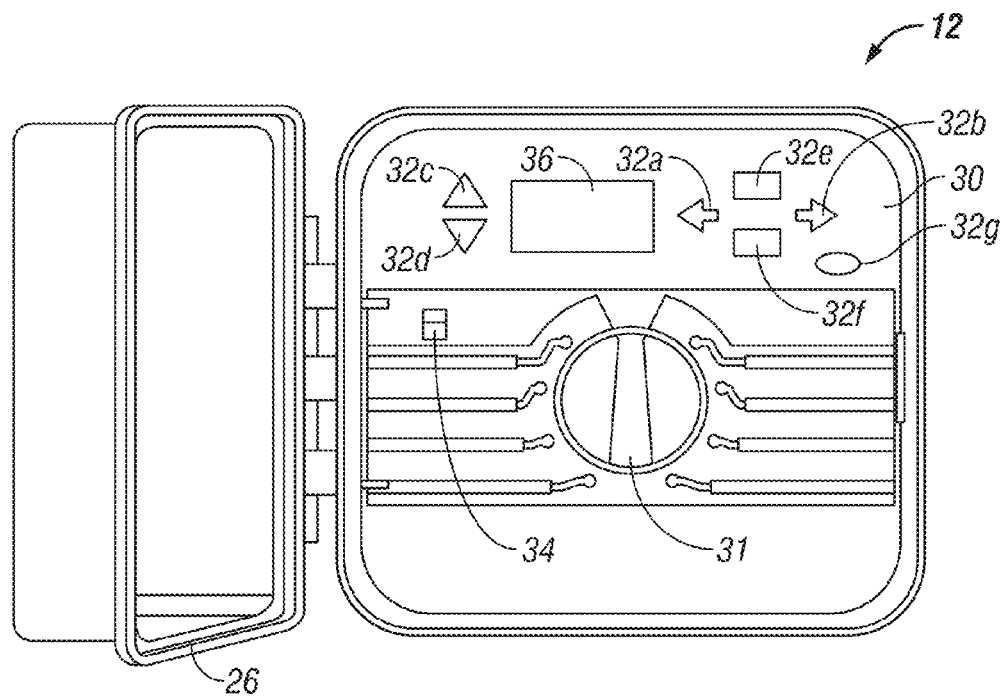
FIG. 2 is a front elevation view of the stand alone irrigation controller of the system of FIG. 1 with its front door open to reveal its removable face pack.
Figure 3:
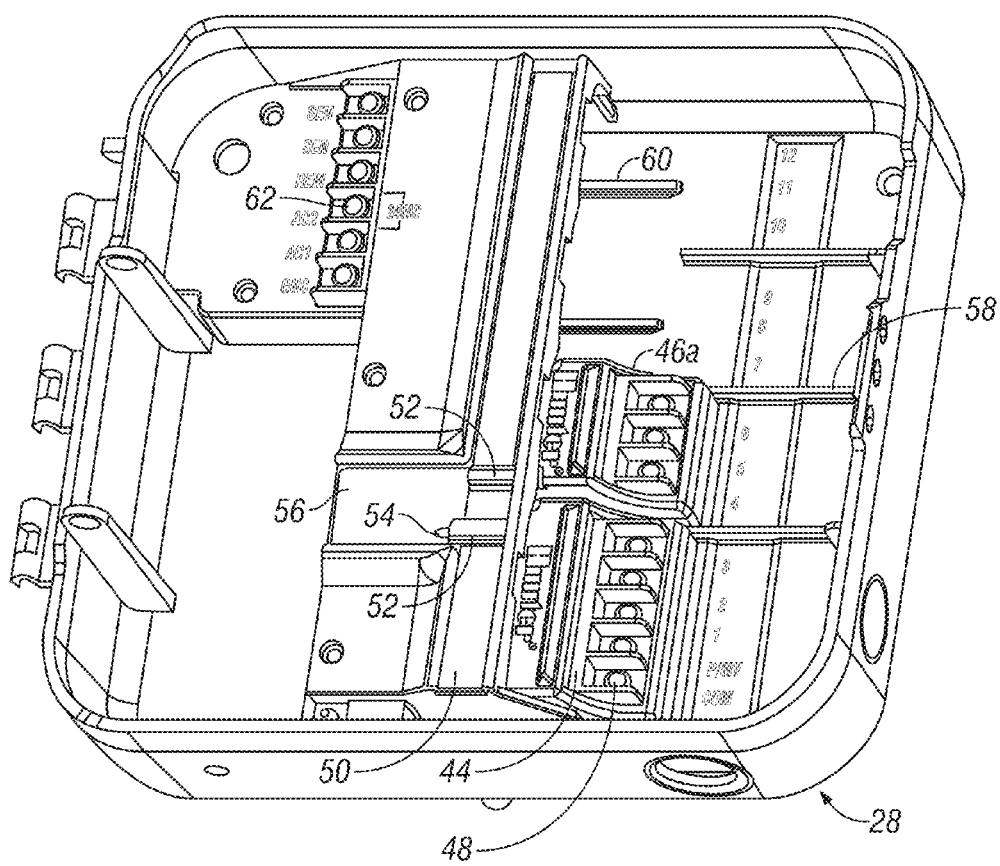
FIG. 3 is an enlarged perspective view of the back panel of the stand alone irrigation controller of FIG. 2 illustrating one base module and one station module plugged into their respective receptacles in the back panel.

Referring to FIG. 2, the stand alone irrigation controller 12 may be the Pro-C modular irrigation controller commercially available from Hunter Industries, Inc. The irrigation controller 12 includes a wall-mountable plastic housing structure in the form of a generally box-shaped front door 26 hinged along one vertical edge to a generally box-shaped back panel 28 (FIG. 3). A generally rectangular face pack 30 (FIG. 2) is removably mounted over the back panel 28 and is normally concealed by the front door 26 when not being accessed for programming. The face pack 30 has an interface in the form of a plurality of manually actuable controls including a rotary knob switch 31 and push button switches 32a-32g as well as slide switch 34 which serves as a sensor by-pass switch. Watering schedules consisting of various run and cycle times can be entered by the user by manipulating the rotary knob switch 31 and selected ones of the push button switches 32a-32g in conjunction with observing numbers, words and/or graphic symbols indicated on a liquid crystal display (LCD) 36. Push buttons 32c and 32d are used to increase or decrease the seasonal adjust value. The watering schedules can be a complicated set of run time and cycle algorithms, or a portion thereof, such as a simple five minute cycle for a single station. Alternatively, existing pre-programmed watering schedules can be selected, such as selected zones every other day. Any or sub-combination of manually actuable input devices such as rotary switches, dials, push buttons, slide switches, rocker switches, toggle switches, membrane switches, track balls, conventional screens, touch screens, etc. may be used to provide an interface that enables a user to select and/or enter a watering schedule. Still another alternative involves uploading watering schedules through the SMARTPORT (Trademark) feature of the irrigation controller 12, more details of which are set forth in the aforementioned U.S. Pat. No. 6,088,621.

Figure 4:
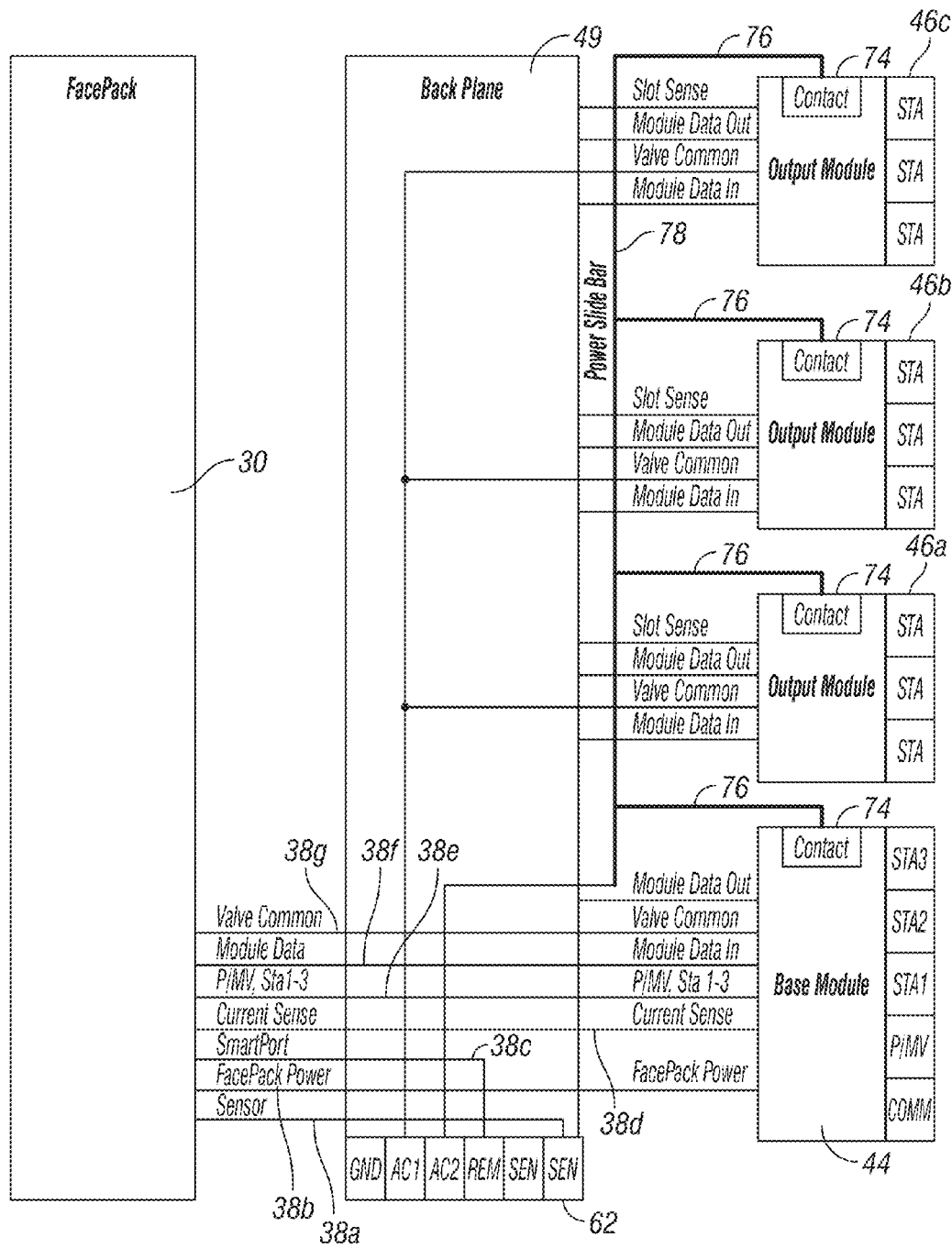
FIG. 4 is a block diagram of the electronic portion of the stand alone irrigation controller of FIG. 2.

The face pack 30 (FIG. 2) encloses and supports a printed circuit board (not illustrated) with a processor for executing and implementing a stored watering program. An electrical connection is made between the face pack 30 and the components in the back panel 28 through a detachable ribbon cable including a plurality of conductors 38a-g (FIG. 4). The circuitry inside the face pack 30 can be powered by a battery to allow a person to remove the face pack 30, un-plug the ribbon cable, and walk around the lawn, garden area or golf course while entering watering schedules or altering pre-existing watering schedules.

A processor 40 (FIG. 5) is mounted on the printed circuit board inside the face pack 30. A watering program stored in a memory 42 is executable by the processor 40 to enable the processor to generate commands for selectively turning a plurality of solenoid actuated irrigation valves (not illustrated) ON and OFF in accordance with the selected or entered watering schedule. An example of such an irrigation valve is disclosed in U.S. Pat. No. 5,996,608 granted Dec. 7, 1999 of Richard E. Hunter et al. entitled DIAPHRAGM VALVE WITH FILTER SCREEN AND MOVEABLE WIPER ELEMENT, the entire disclosure of which is hereby incorporated by reference. Said patent is also assigned to Hunter Industries, Inc. Typically the solenoid actuated valves are mounted in subterranean plastic boxes (not illustrated) on the irrigated site.

The processor 40 communicates with removable modules 44 and 46a-c (FIG. 3) each containing a circuit that includes a plurality of solid state switches, such as triacs. These switches turn twenty-four volt AC current ON and OFF to open and close corresponding solenoid actuated valves via connected to dedicated field valve wires and a common return line to screw terminals 48 on the modules 44 and 46a-c.

In FIG. 3, the modules 44 and 46a are shown installed in side-by-side fashion in station module receptacles formed in the back panel 28. The module 44 serves as a base module that can turn a master valve ON and OFF in addition to a plurality of separate station valves. Each module includes an outer generally rectangular plastic housing with a slot at its forward end. A small printed circuit board (not illustrated) within the module housing supports the station module circuit that includes conductive traces that lead to the screw terminals 48 and to V-shaped spring-type electrical contacts (not illustrated) that are accessible via the slot in the forward end of the module housing. These V-shaped electrical contacts register with corresponding flat electrical contacts on the underside of a relatively large printed circuit board 49 (FIG. 4) mounted inside the back panel 28 when the module 44 is slid into its corresponding receptacle. The relatively large printed circuit board 49 is referred to as a "back plane." The base module 44 and station modules 46a-c and the back plane 49 are thus electrically and mechanically connected in releasable fashion through a so-called "card edge" connection scheme when the base module 44 and station modules 46a-c are inserted or plugged into their respective receptacles.

An elongate locking bar 50 (FIG. 3) can be manually slid up and down in FIG. 4 between locked and unlocked positions to secure and un-secure the modules 44 and 46a-c after they have been fully inserted into their respective receptacles. Opposing raised projections 52 formed on the locking bar 50 facilitate sliding the locking bar 50 with a thumb. A pointer 54 extends from one of the raised projections 52 and serves as a position indicator that aligns with LOCKED and UNLOCKED indicia (not illustrated) molded into the upper surface of another plastic support structure 56 mounted inside back panel 28.

The receptacles for the modules such as 44 and 46a-c are partially defined by vertical walls 58 (FIG. 3) formed on the back panel 28. Vertical walls 60 also formed on the back panel 28 to provide support to the modules 44 and 46a-c. An auxiliary terminal strip provides additional screw terminals 62 for connecting remote sensors and accessories. The term "receptacles" should be broadly construed as defined in one or more of the patents and pending applications incorporated by reference above.

Figure 5:
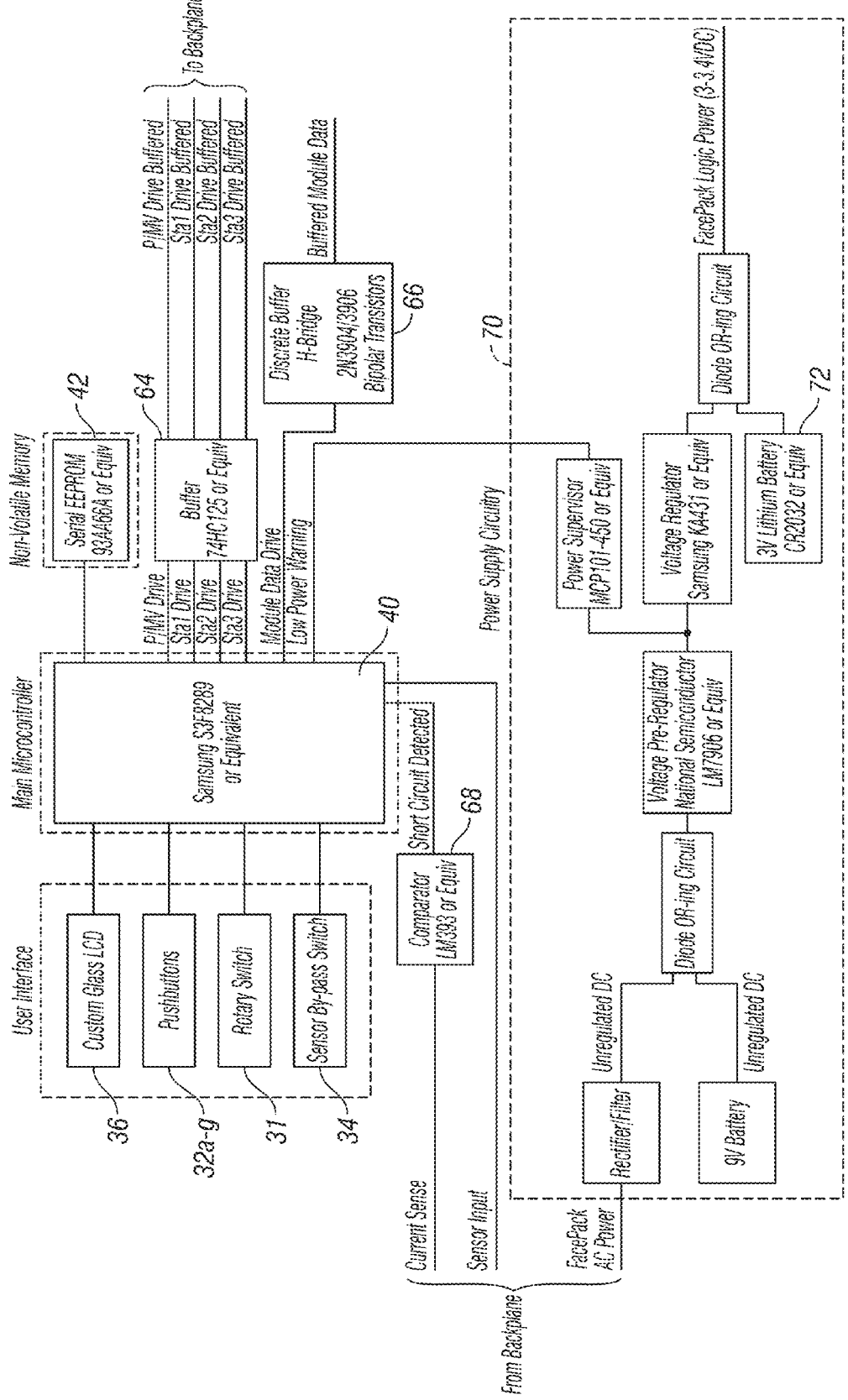
FIG. 5 is a block diagram illustrating further details of the electronic portion of the stand alone irrigation controller of FIG. 2 that resides in the face pack of the controller.

FIGS. 4 and 5 are block diagrams of the electronic portion of the stand alone irrigation controller 12. The electronic components are mounted on printed circuit boards contained within the face pack 30, back panel 28, base module 44 and station modules 46a-c. The processor 40 (FIG. 4) is mounted on the printed circuit board inside the face pack 30 and executes the watering program stored in the memory 42. By way of example, the processor 40 may be a Samsung S3F8289 processor that executes a program stored in the separate memory 42 which can be an industry standard designation Serial EEPROM 93AA6A non-volatile memory device. Alternatively, the processor 40 and memory 42 may be provided in the form of a micro-computer with on-chip memory. The manually actuable controls 31, 32a-32g and 34 and the LCD display 36 of the face pack 30 are connected to the processor 40. The processor 40 sends drive signals through buffer 64 and back plane 49 to the base module 44. By way of example the buffer 64 may be an industry standard designation 74HC125 device. The processor 40 sends data signals to the modules 46a-c through buffer 66. The buffer 66 may be an H-bridge buffer including industry standard 2N3904/3906 discrete bipolar transistors.

The processor 40 (FIG. 4) controls the base module 44 and the station modules 46a-c in accordance with one or more watering schedules. Serial or multiplexed communication is enabled via the back plane 49 to the base module 44 and to each of the output modules 46a-c. Suitable synchronous serial data and asynchronous serial data station module circuits are disclosed in the aforementioned U.S. Pat. No. 6,721,630. The location of each module in terms of which receptacle it is plugged into is sensed using resistors on the back plane 49 and a comparator 68 (FIG. 5) which may be an industry standard LM393 device. The face pack 30 receives twenty-four volt AC power from the transformer 25 through the back plane 49 and regulates the same via a power supply circuit 70 (FIG. 5). The power supply circuit 70 includes a National Semiconductor LM7906 voltage regulator, a Microchip Technology MCP101-450 power supervisor, and a Samsung KA431 voltage regulator. A lithium battery 72 such as an industry standard CR2032 battery is included in the power supply circuit 70 and provides backup power to the micro controller to maintain the internal clock in the event of a power failure. The face pack ribbon cable 38a-g (FIG. 4) that connects the face pack 30 and the back plane 49 can be disconnected, and a nine volt battery (FIG. 5) then supplies power to the face pack 30. This allows a user to remove the face 30 pack from the back panel 28 and enter or modify watering schedules as he or she walks around the irrigation site.

The modules 44 and 46a-c have contacts 74 (FIG. 4) on the top sides of their outer plastic housings. When the modules are first plugged into their receptacles, only a communication path is established with the processor 40 via the back plane 49. At this time the locking bar 50 (FIG. 3) is in its UNLOCKED position. Thereafter, when the locking bar is slid to its LOCKED position finger-like contacts 76 (FIG. 4) on the underside of the locking bar 50 register with the contacts 74 on the tops of the modules 44 and 46a-c to supply twenty-four volt AC power to the modules that is switched ON and OFF to the valves that are connected to the modules. The finger-like contacts 76 are connected to a common conductor 78 carried by the locking bar 50. When the locking bar 50 is slid to its LOCKED position projections and tabs that extend from the locking bar 50 and the modules are aligned to prevent withdrawal of the modules. See the aforementioned U.S. Pat. No. 7,225,058 for further details.

Figure 6:
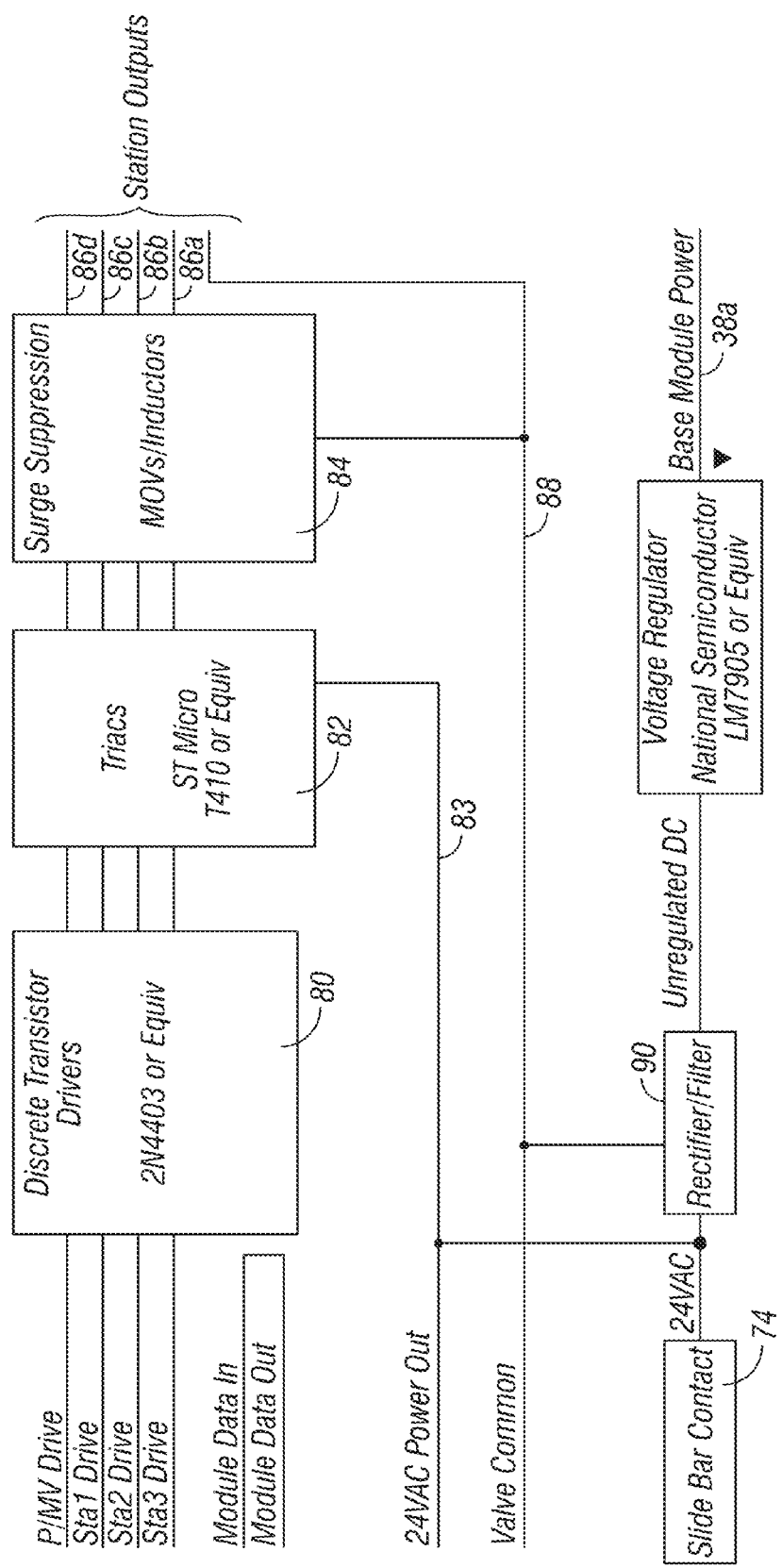
FIG. 6 is a block diagram illustrating further details of the electronic portion of the stand alone irrigation controller of FIG. 2 that resides in the base module.

FIG. 6 is a block diagram illustrating details of the electronic circuit of the base module 44. The base module circuit includes transistor drivers 80 and triacs 82 for switching the twenty-four volt AC signal ON and OFF to different solenoid actuated valves. By way of example, the transistor drivers 80 may be industry standard 2N4403 transistors and the triacs may be ST Microelectronics (Trademark) T410 triacs. The twenty-four volt AC signal is supplied to the triacs 82 via contact 74 and line 83. The twenty-four volt AC signal from each of the triacs 82 is routed through an inductor/MOV network 84 for surge suppression to four field valve lines 86a-d, each of which can be connected to a corresponding solenoid actuated valve. The valves are each connected to a valve common return line 88. The twenty-four volt AC signal is also supplied to a rectifier/filter circuit 90. The unregulated DC signal from the rectifier/filter circuit 90 is supplied to a National Semiconductor LM7905 voltage regulator 92 which supplies five volt DC power to the face pack 30 via a conductor 38c (FIG. 4) in the ribbon cable.

Figure 7:
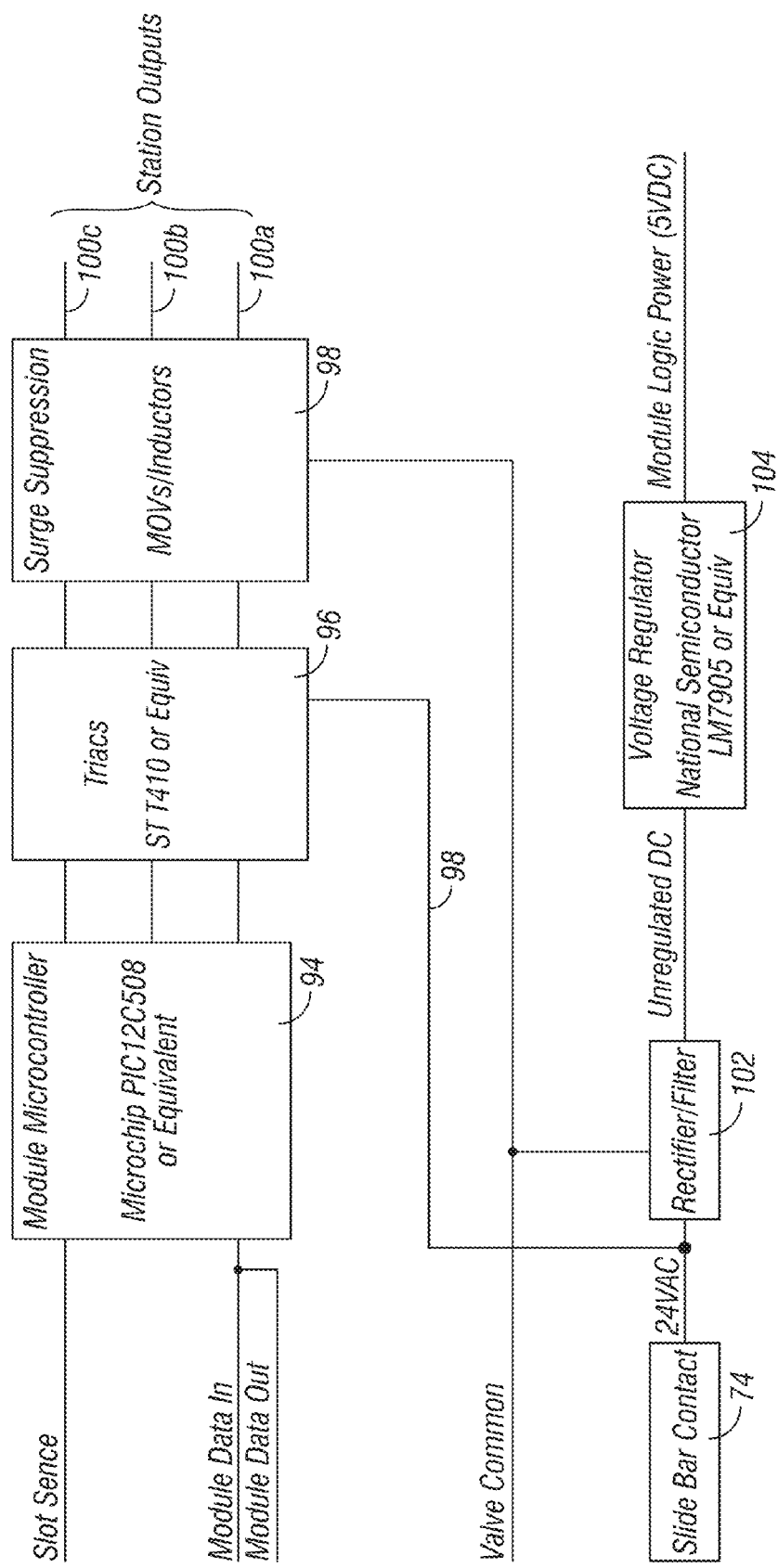
FIG. 7 is a block diagram illustrating further details of the electronic portion of the stand alone irrigation controller of FIG. 2 that resides in each of the station modules.

FIG. 7 is a block diagram illustrating details of the electronic circuit in each of the station modules 46a-c. The station module circuit includes a microcontroller such as the Microchip (Trademark) PIC 12C508 processor 94. The station module circuit further includes triacs 96 for switching the twenty-four volt AC signal ON and OFF to three different solenoid actuated valves. The twenty-four volt AC signal is supplied to the triacs 96 via contact 74 and line 98. The twenty-four volt AC signal from each of the triacs 94 is routed through an inductor/MOV network 98 including Epcos Inc. S10K35 MOV's for surge suppression to three field valve lines 100*a-c*, each of which can be connected to a corresponding solenoid actuated valve. The valves are each connected to the valve common return line 88. The twenty-four volt AC signal is also supplied to a rectifier/filter circuit 90. The unregulated DC signal from the rectifier/filter circuit 102 is supplied to a National Semiconductor LM7905 voltage regulator 104 which supplies five volt DC power to the microcontroller through a conductor (not illustrated).

Figure 8A:
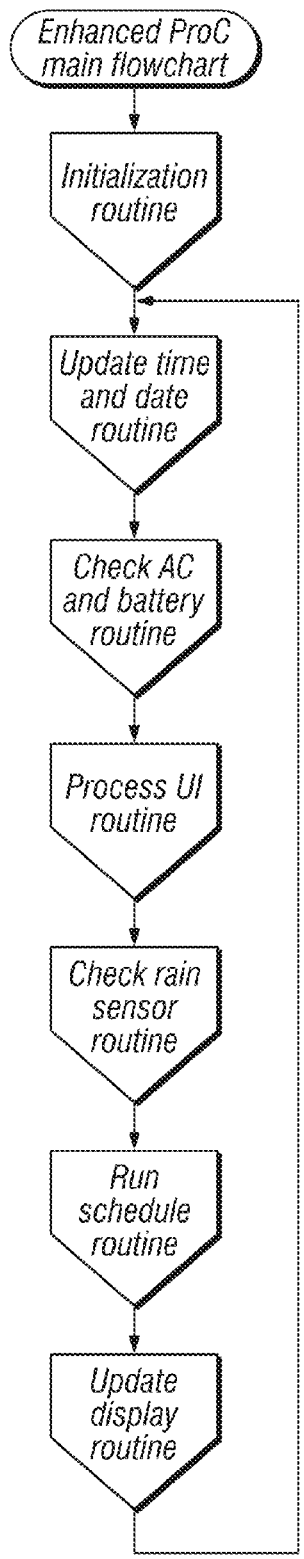
FIGS. 8A-8W are detailed flow diagrams illustrating the operation of the stand alone irrigation controller of FIG. 2.
Figure 8B:
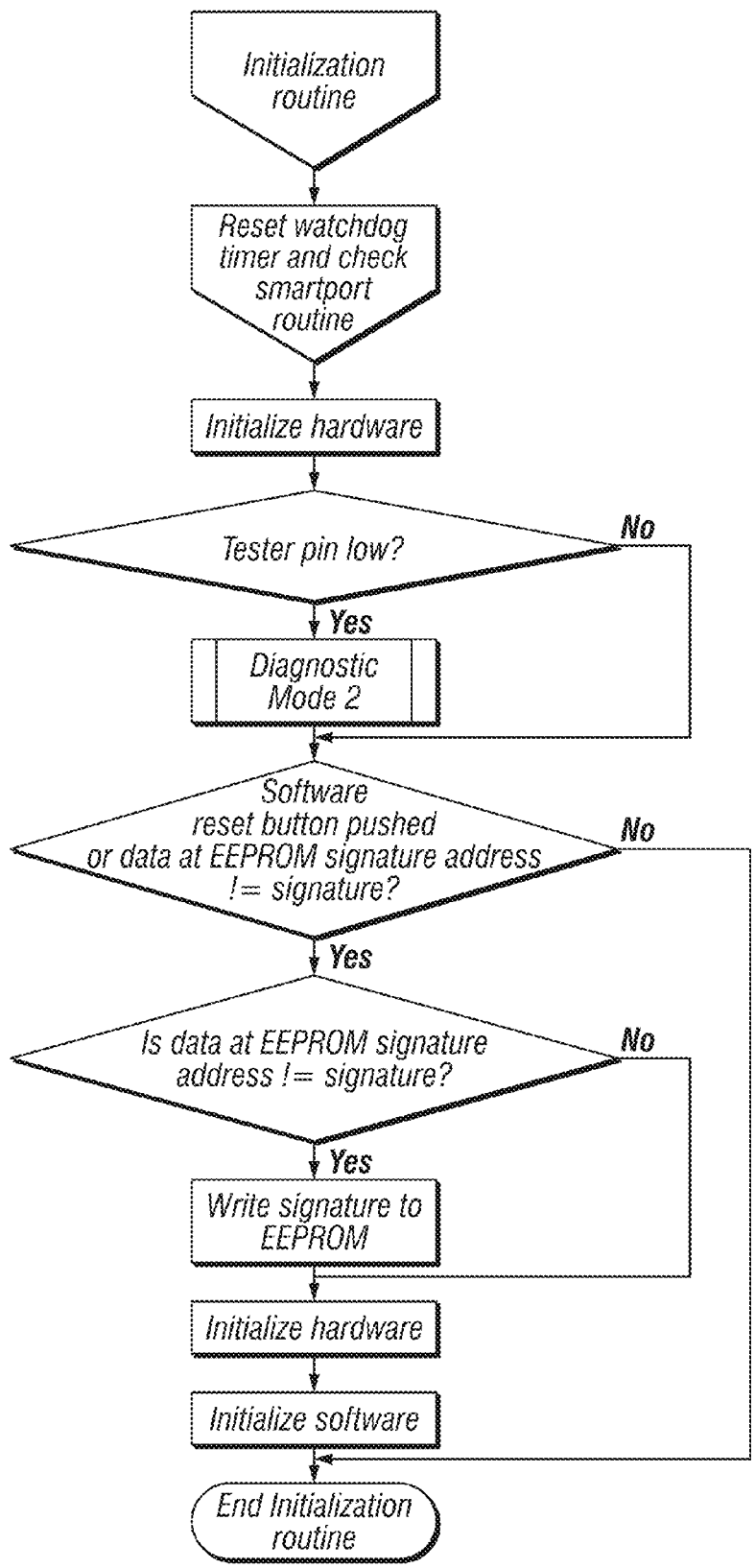
Figure 8C:
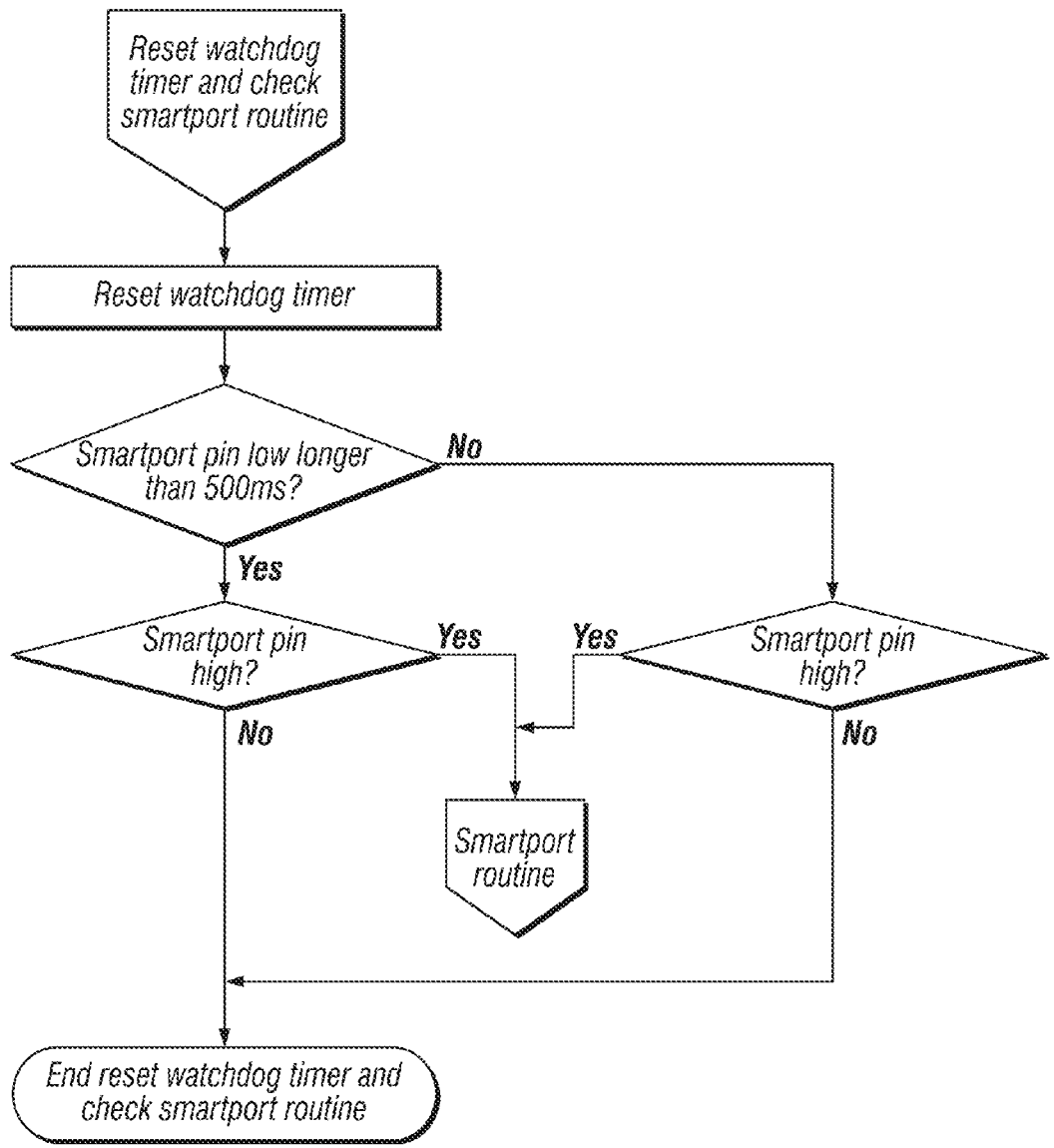
Figure 8D:
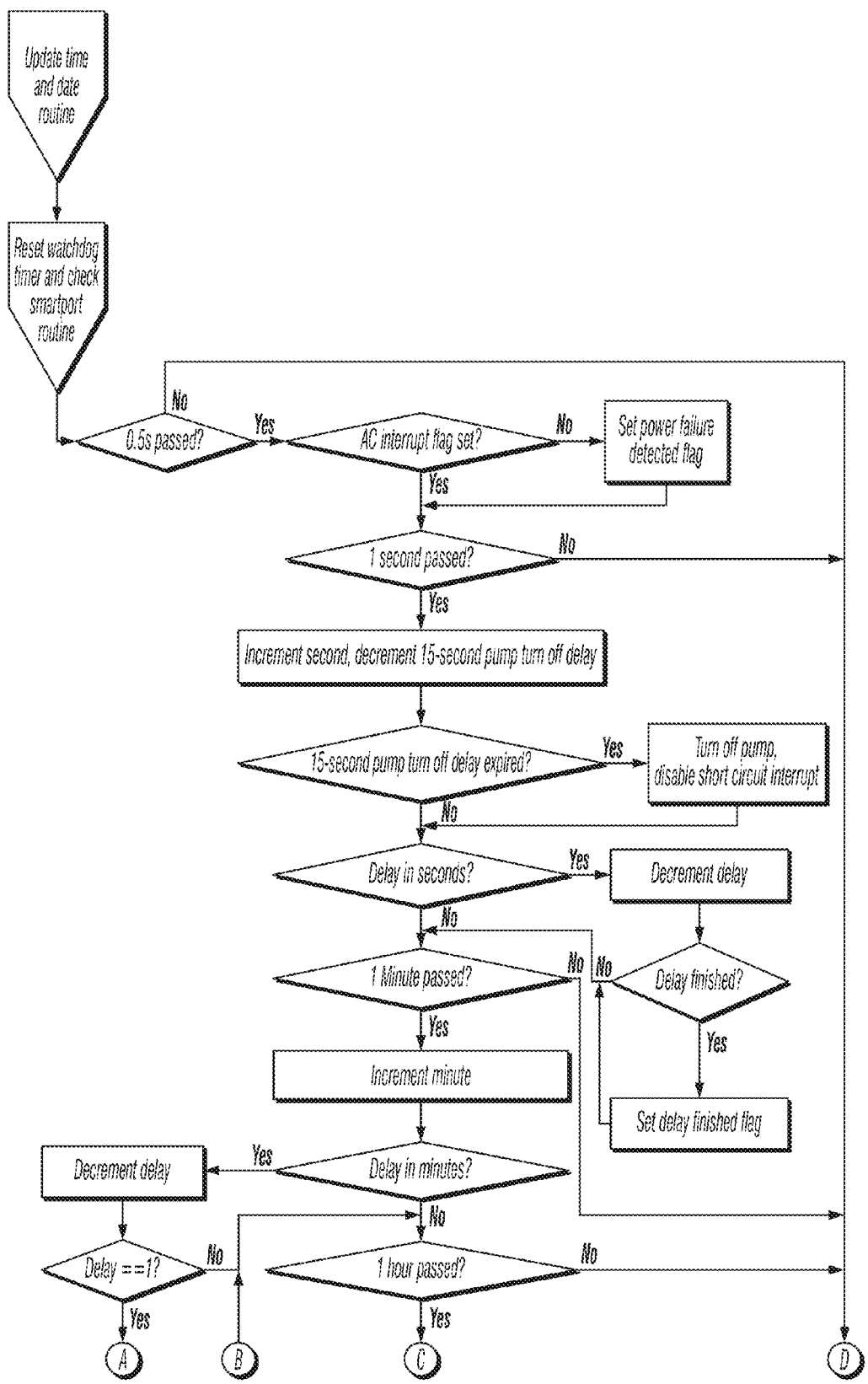
Figure 8D:
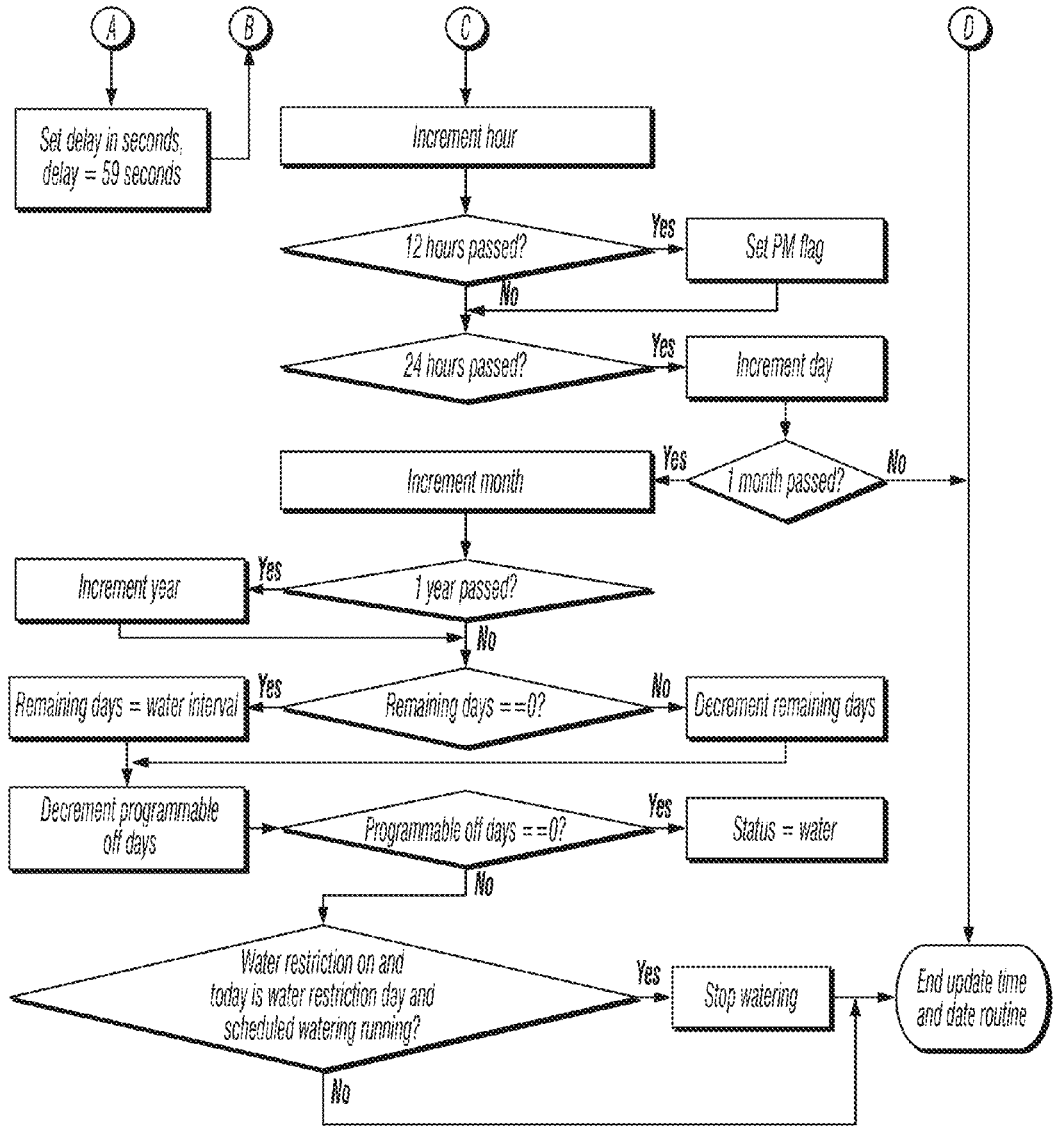
Figure 8E:
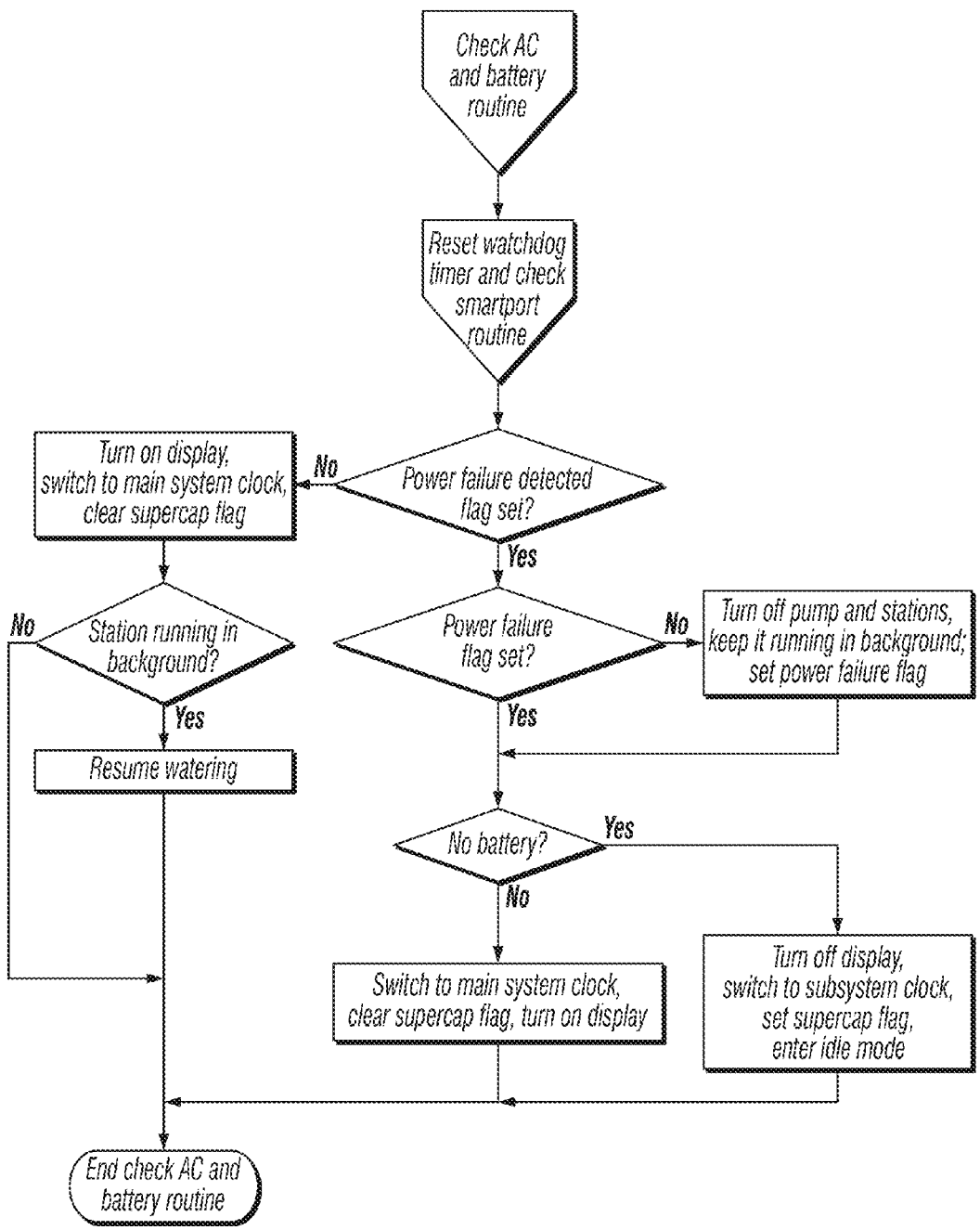
Figure 8F:
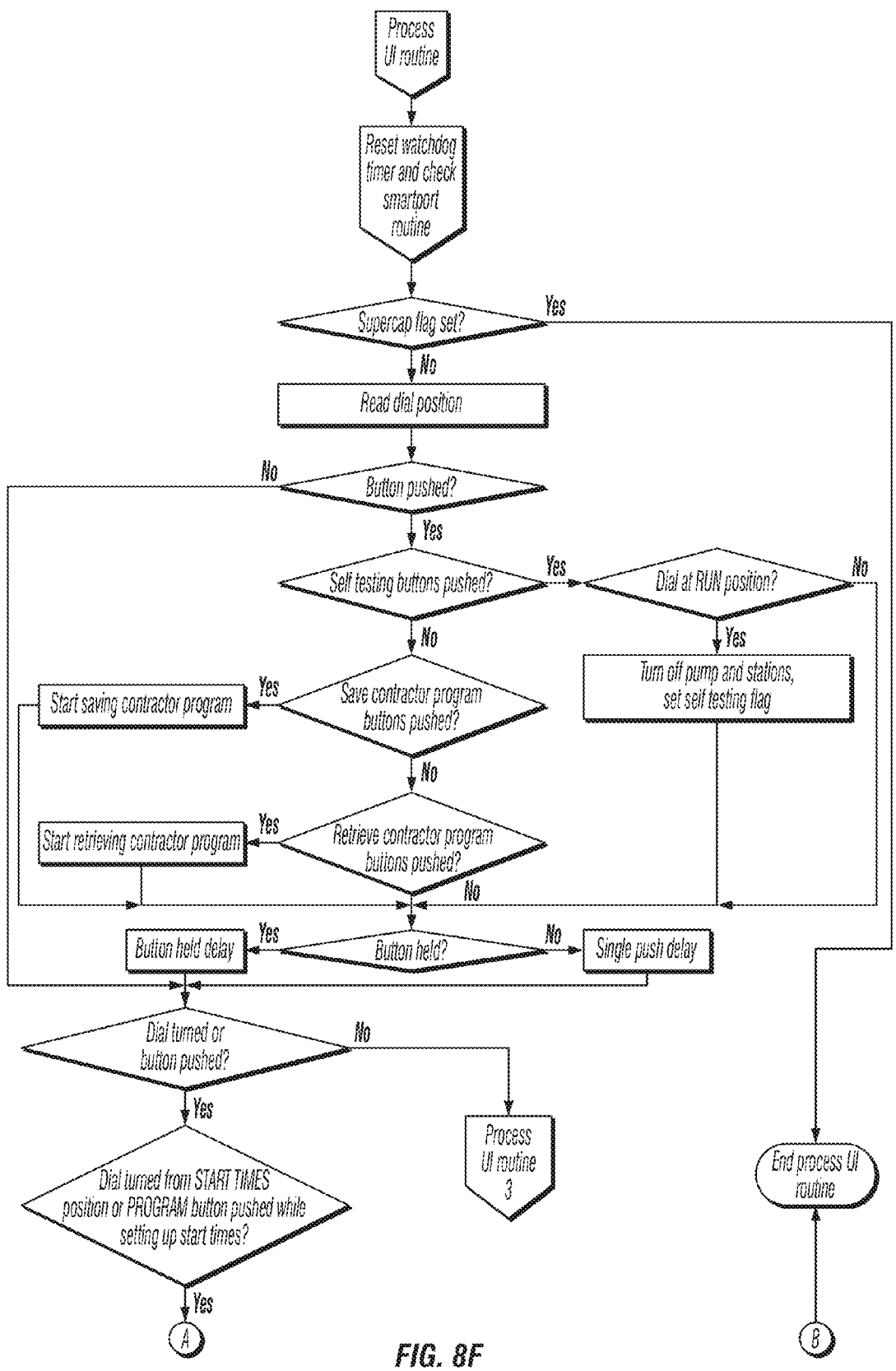
Figure 8F:
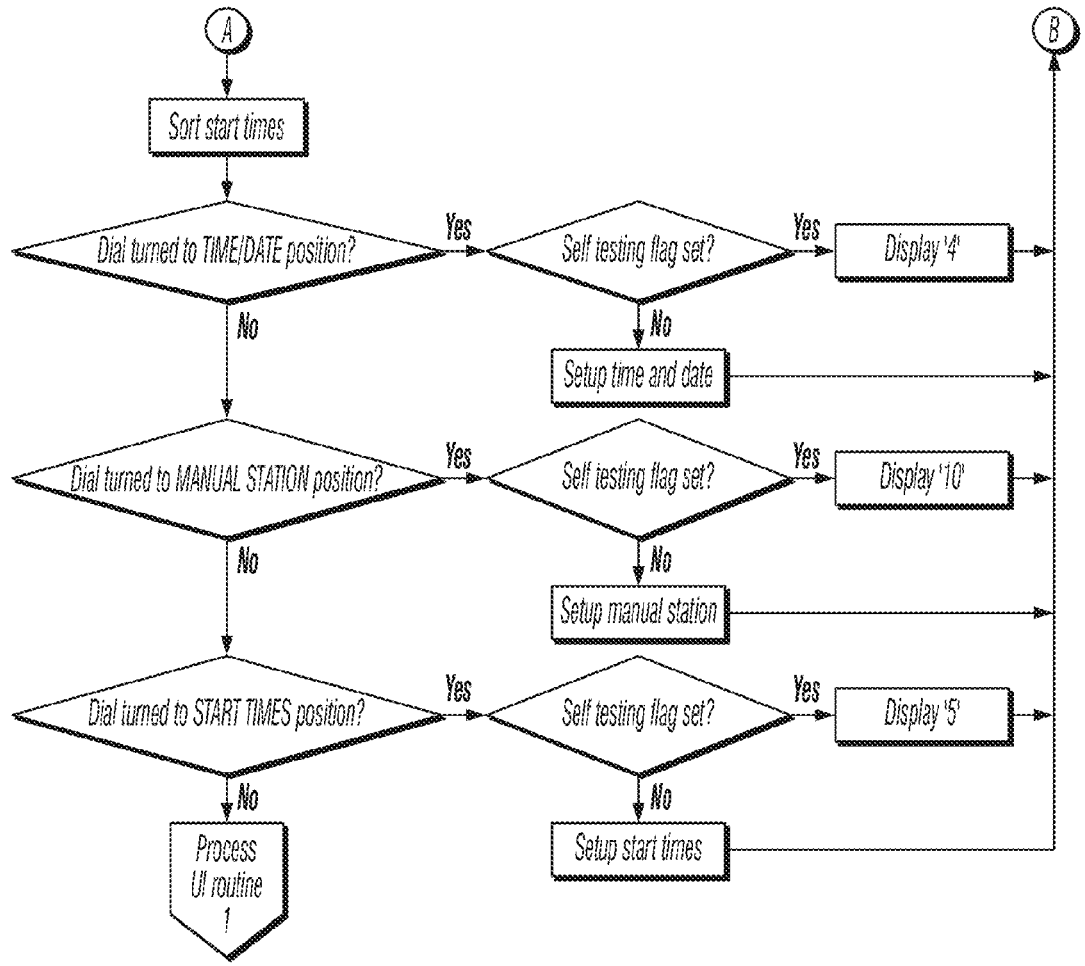
Figure 8G:
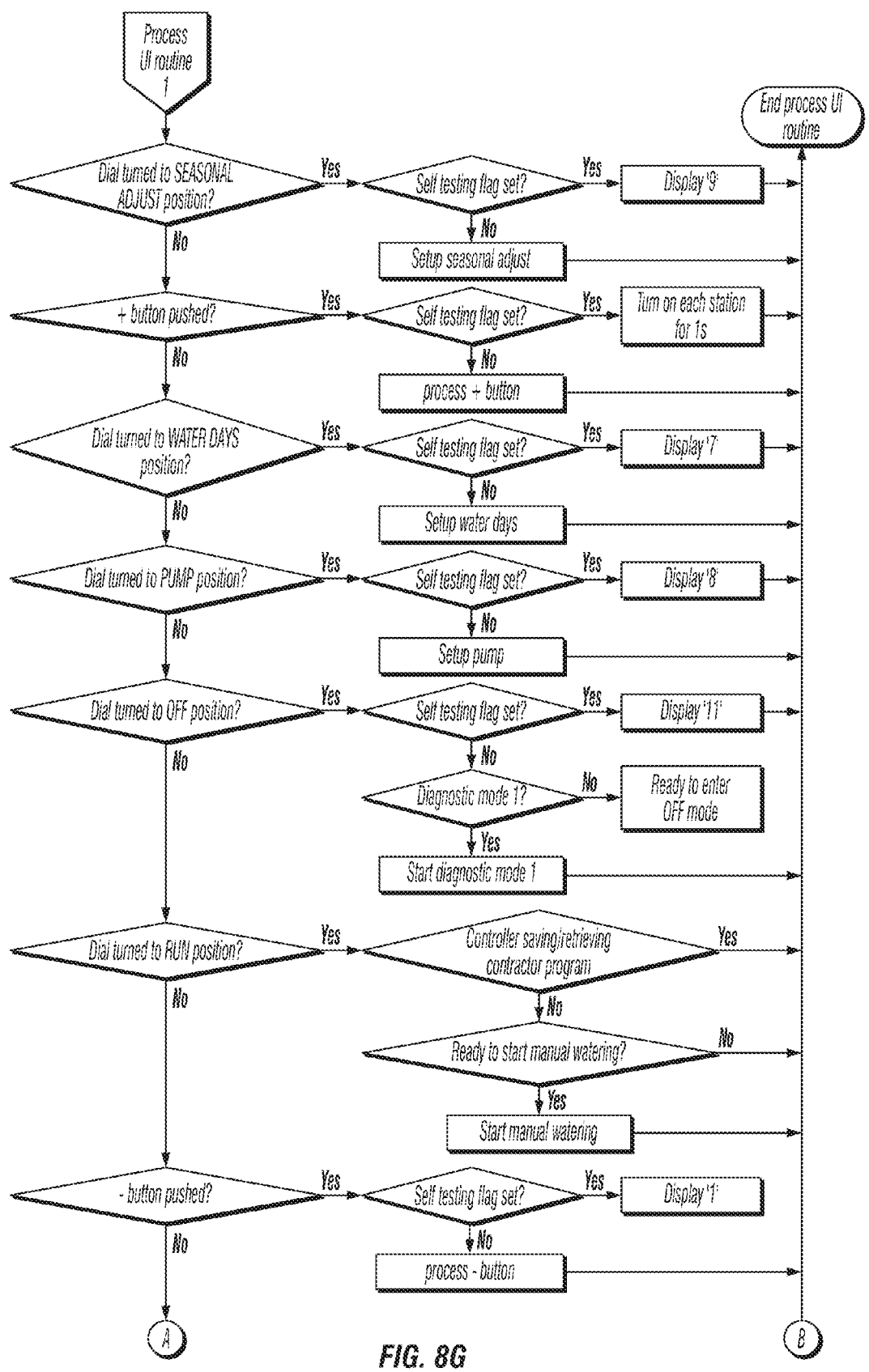
Figure 8G:
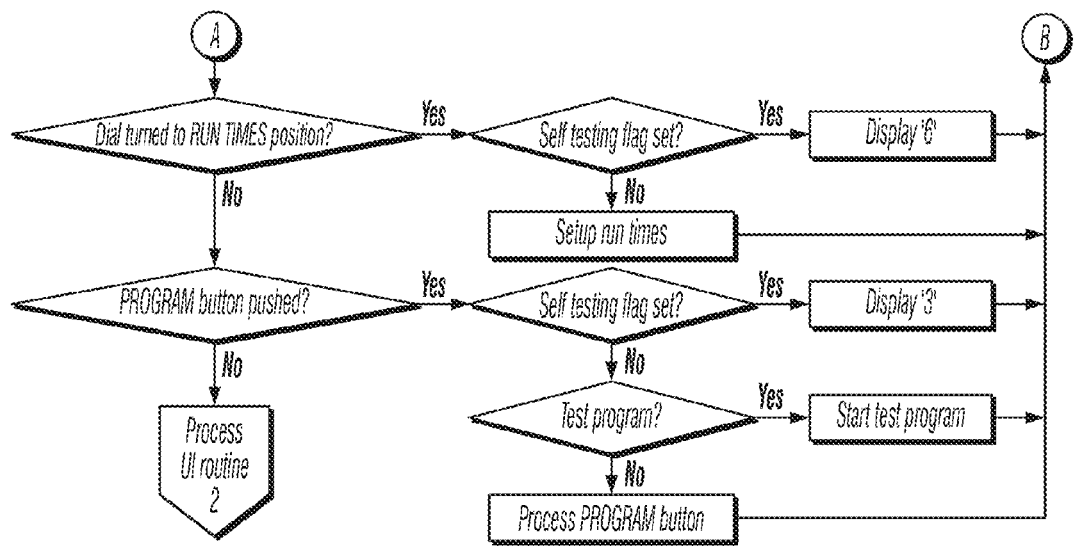
Figure 8H:
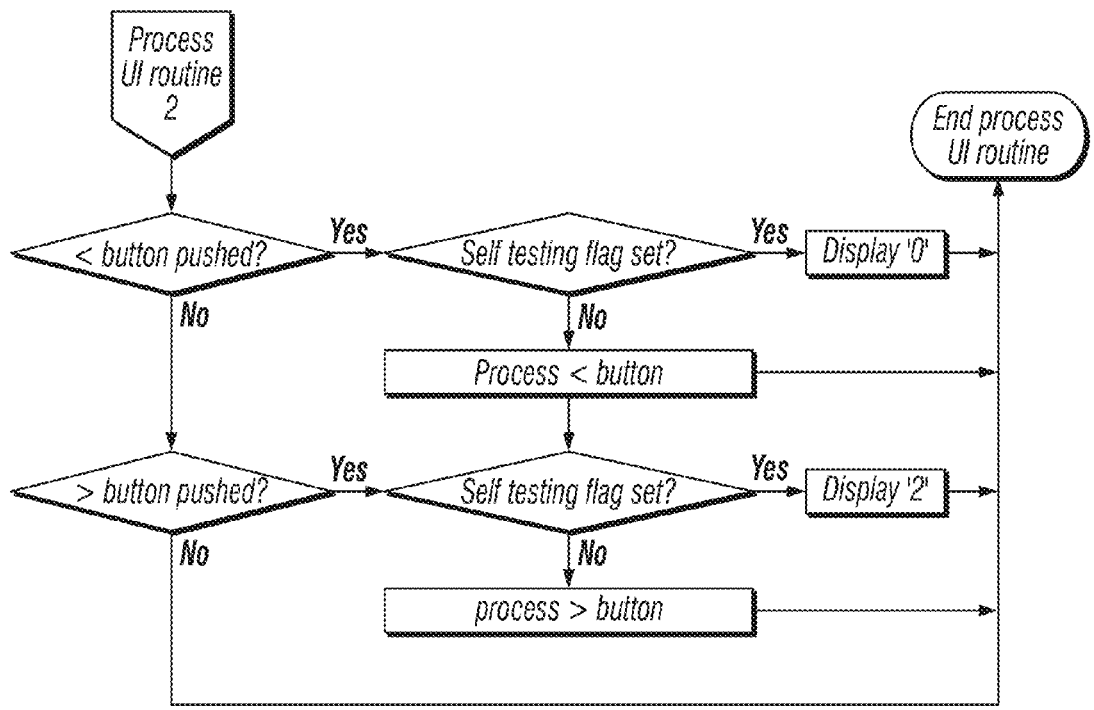
Figure 8I:
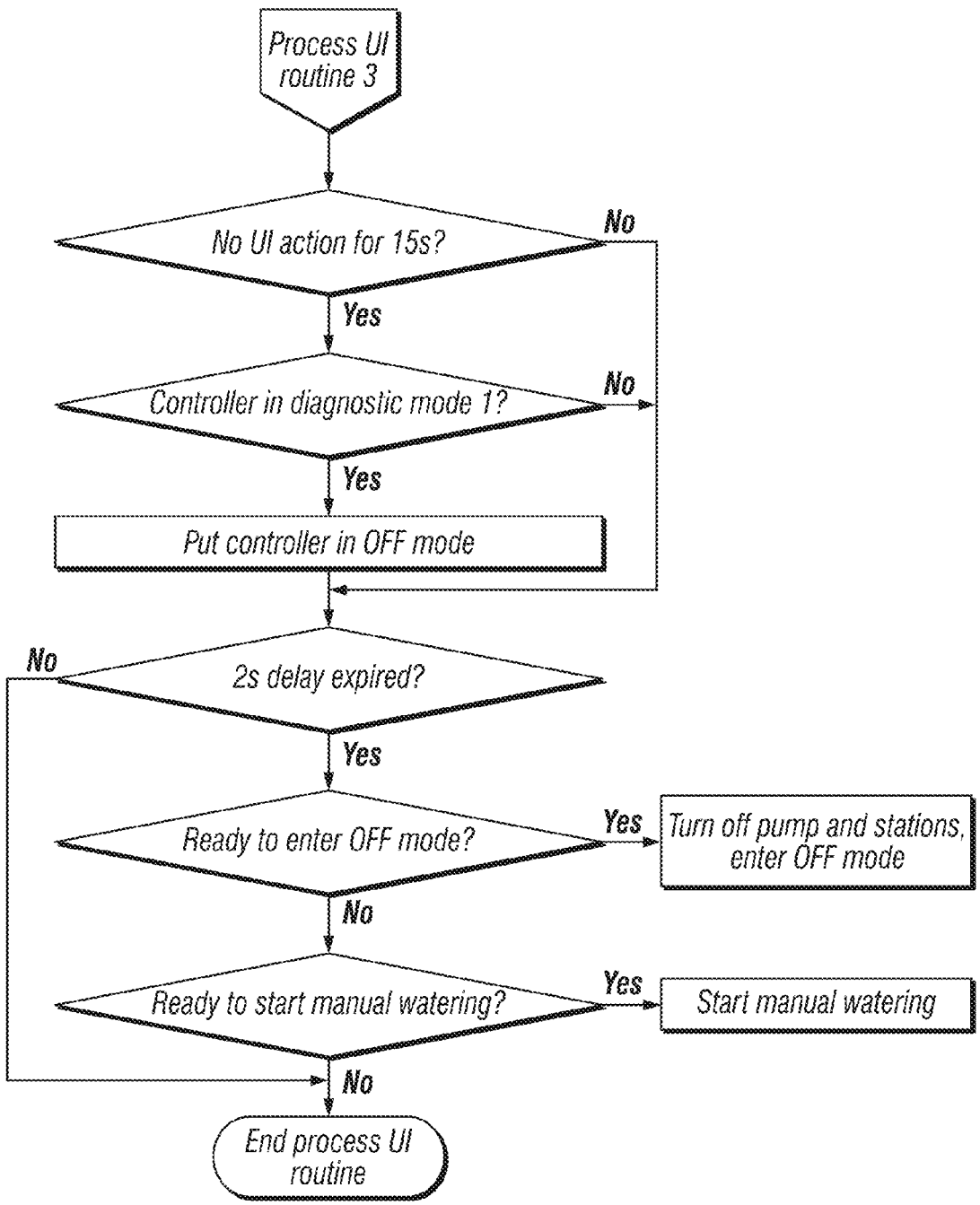
Figure 8J:
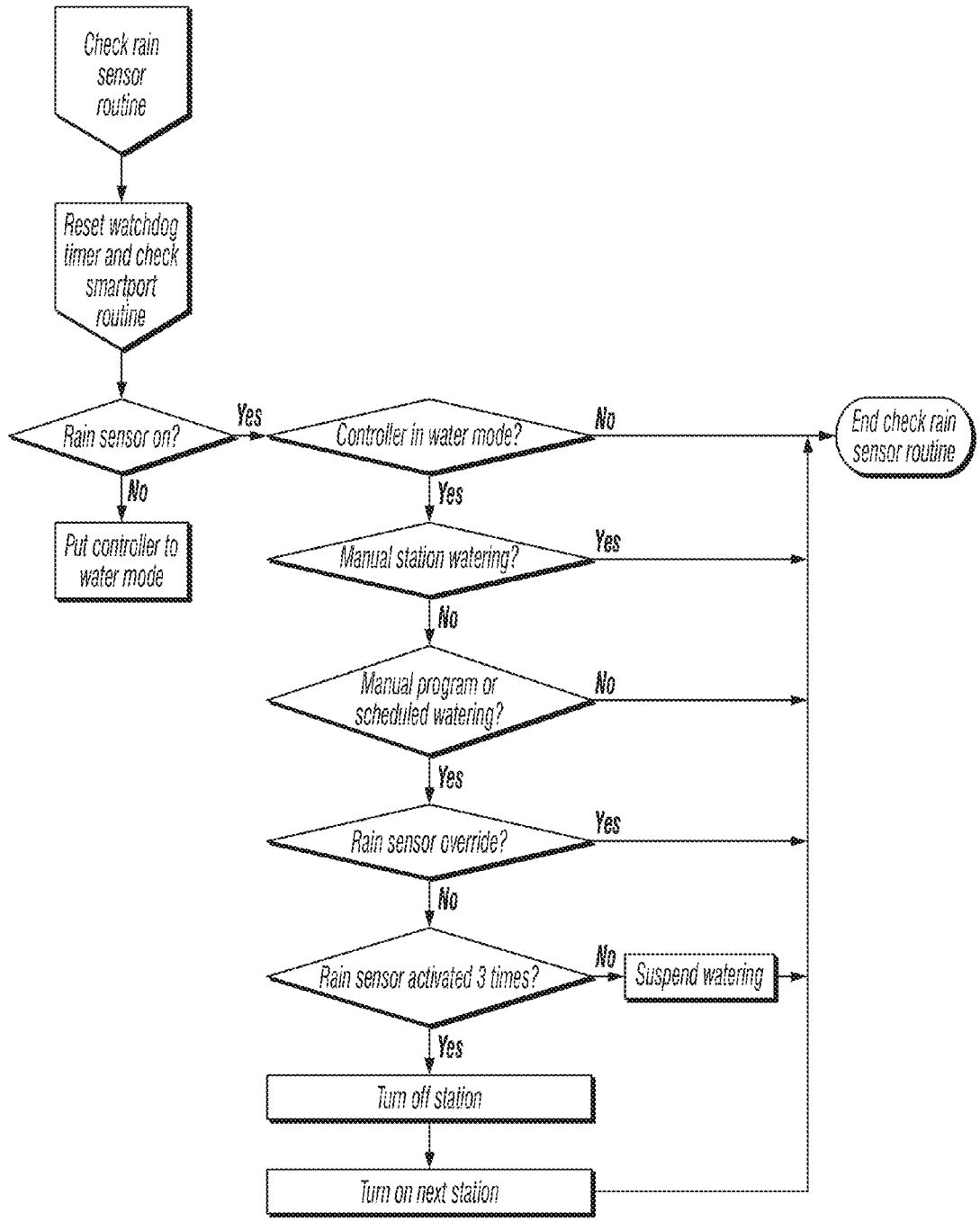
Figure 8K:
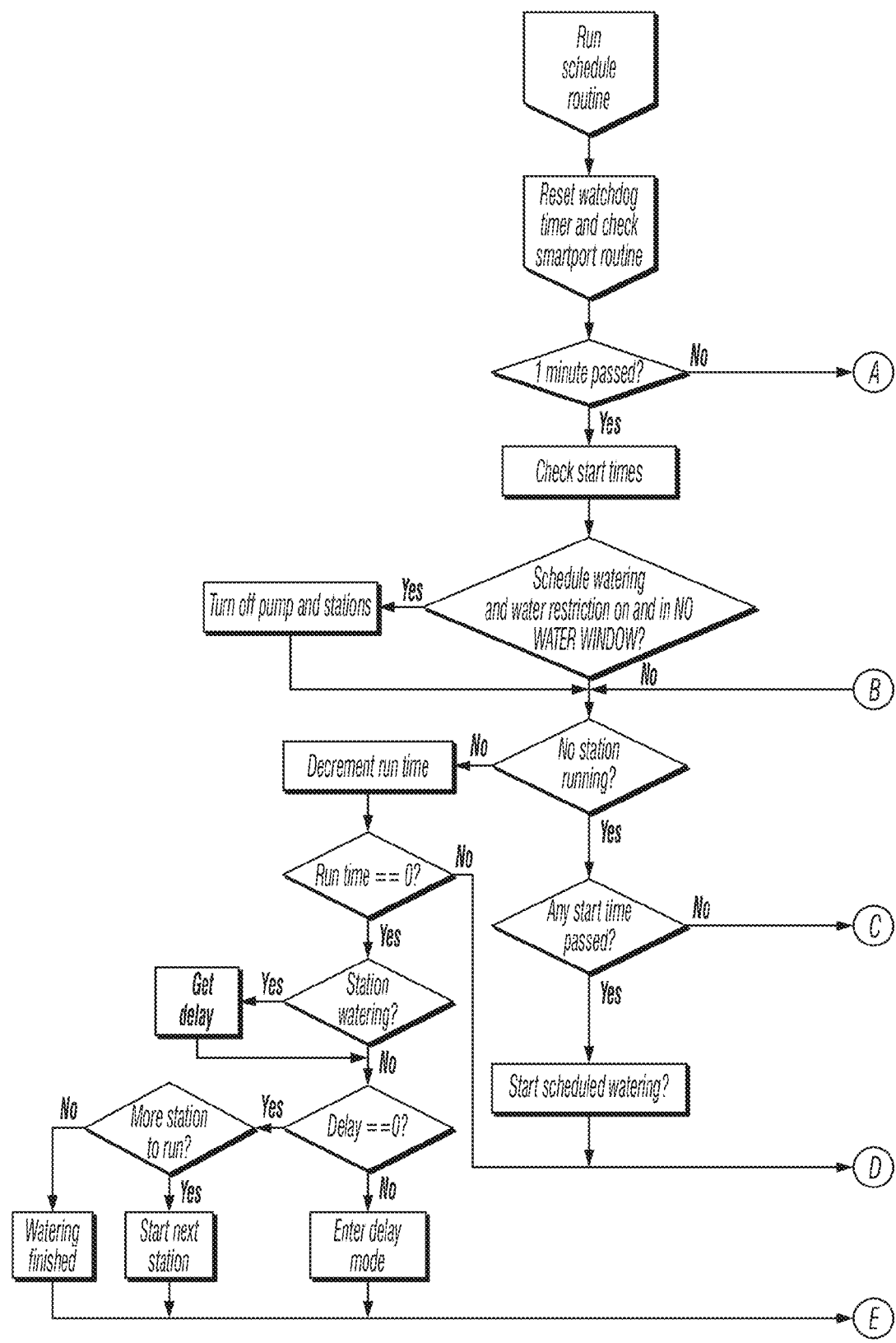
Figure 8K:
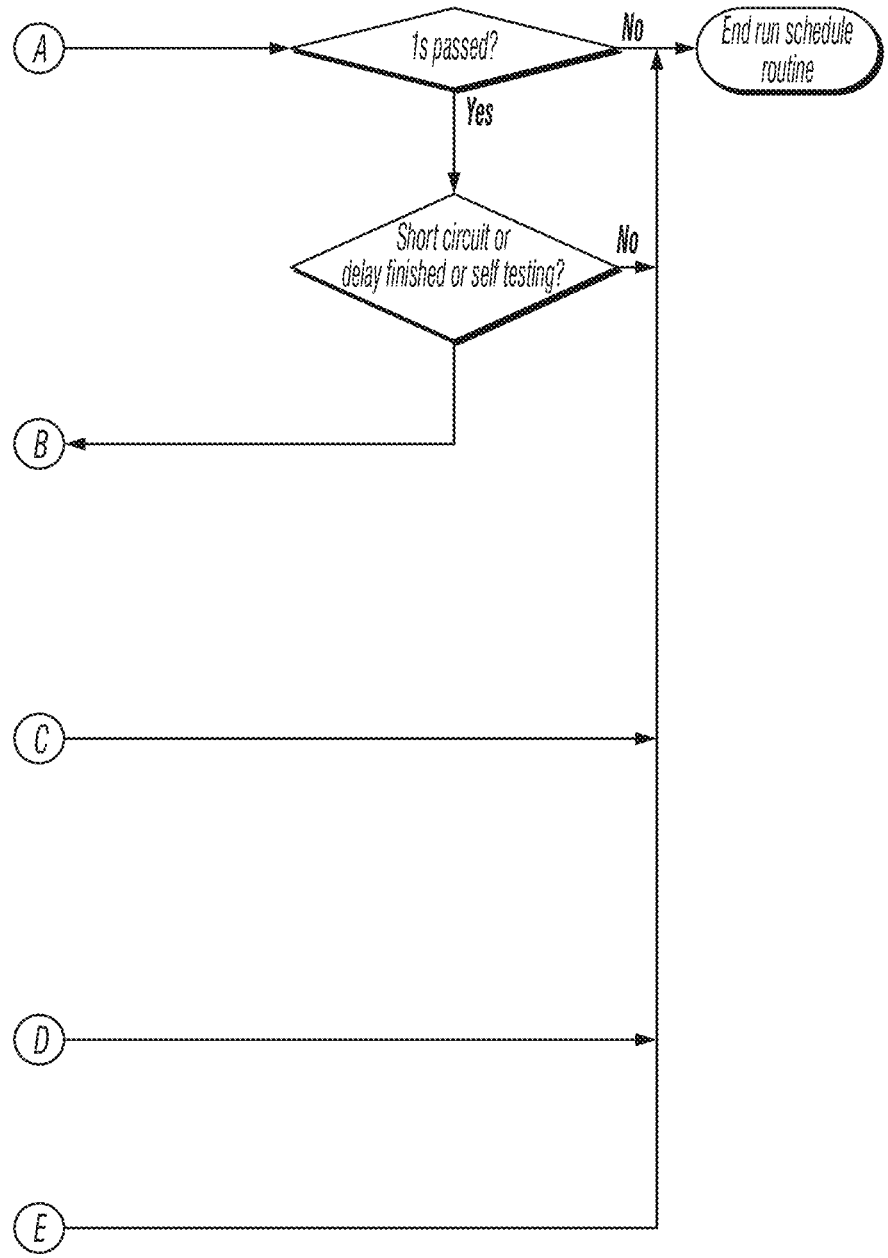
Figure 8L:
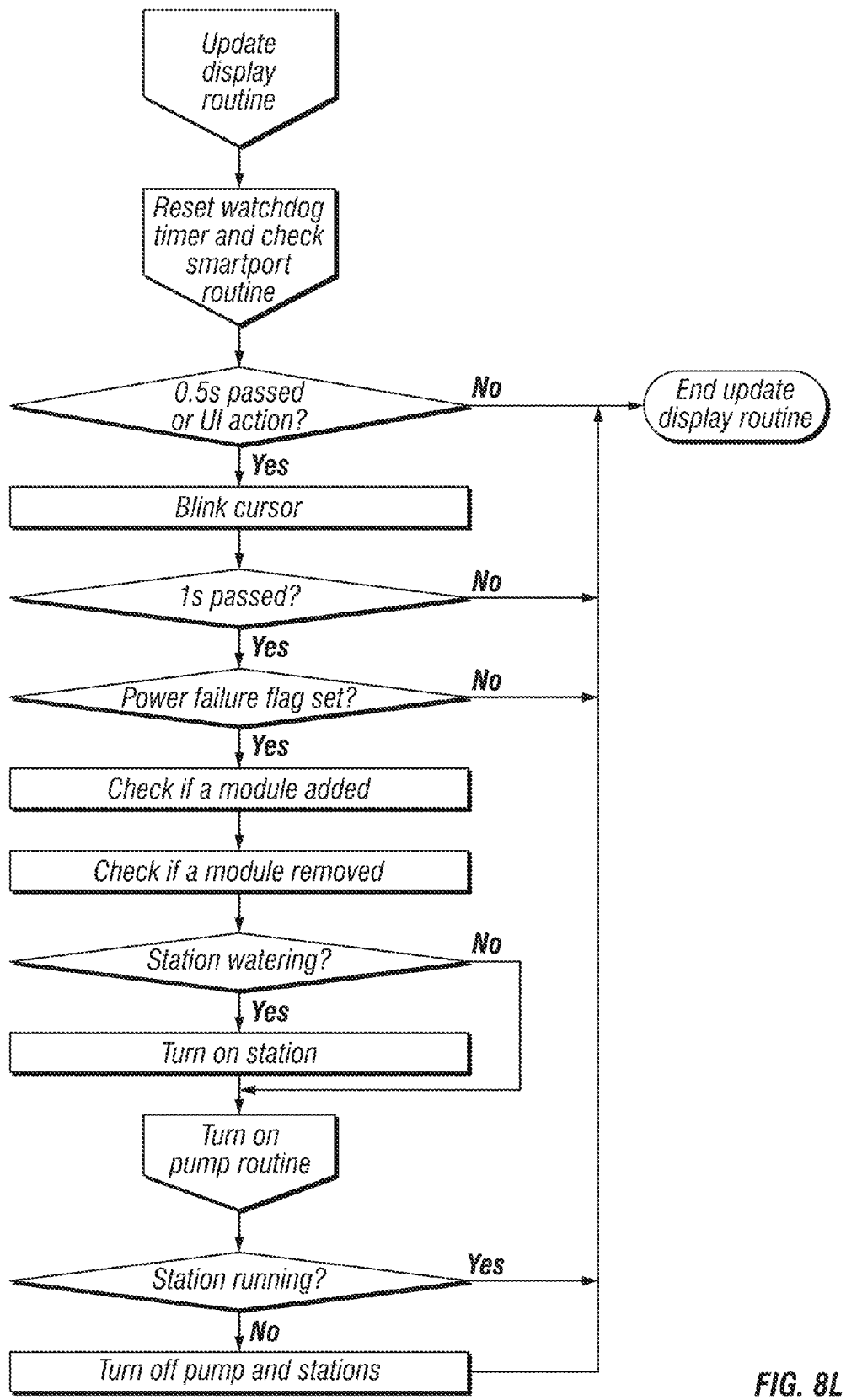
Figure 8M:
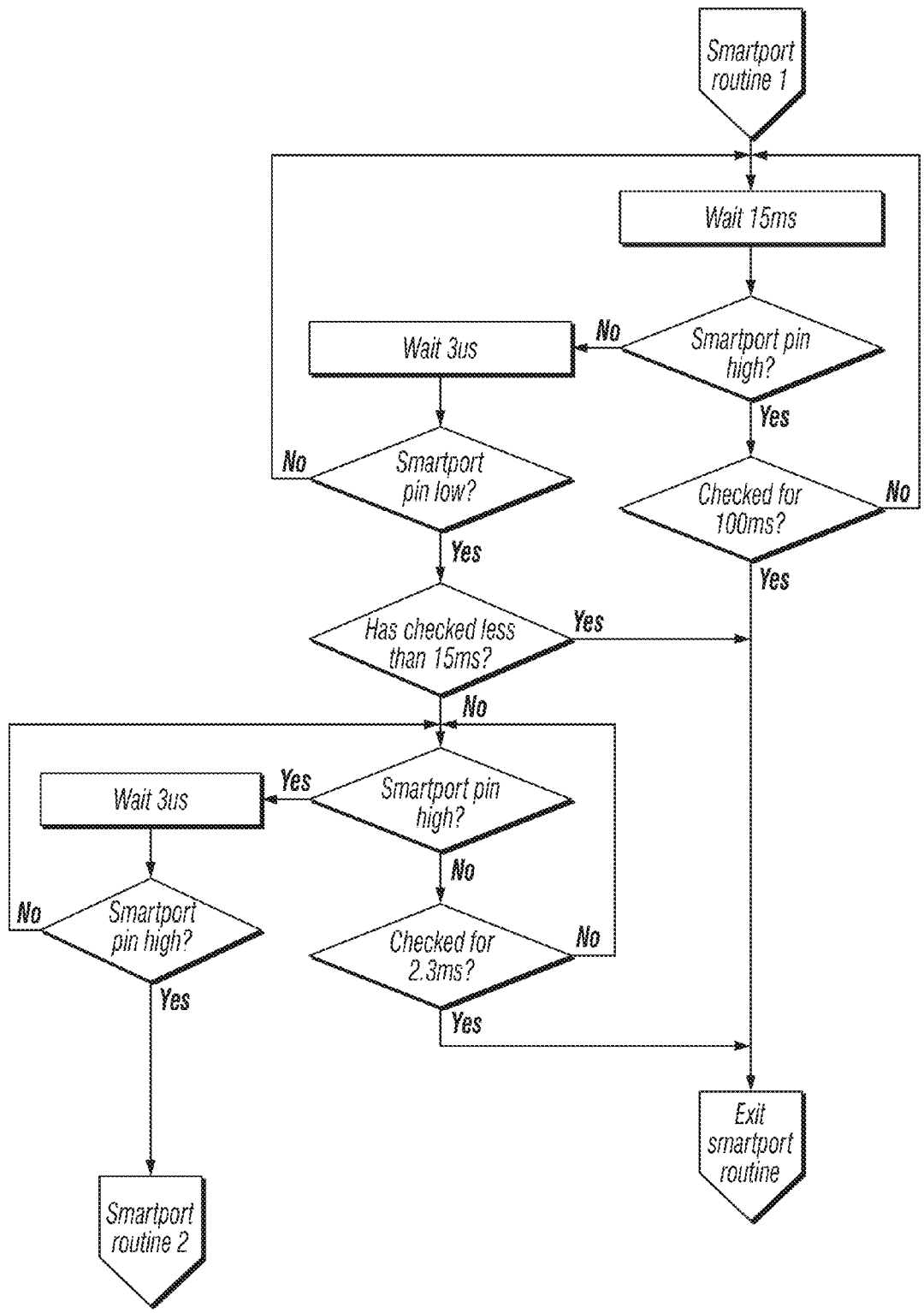
Figure 8N:
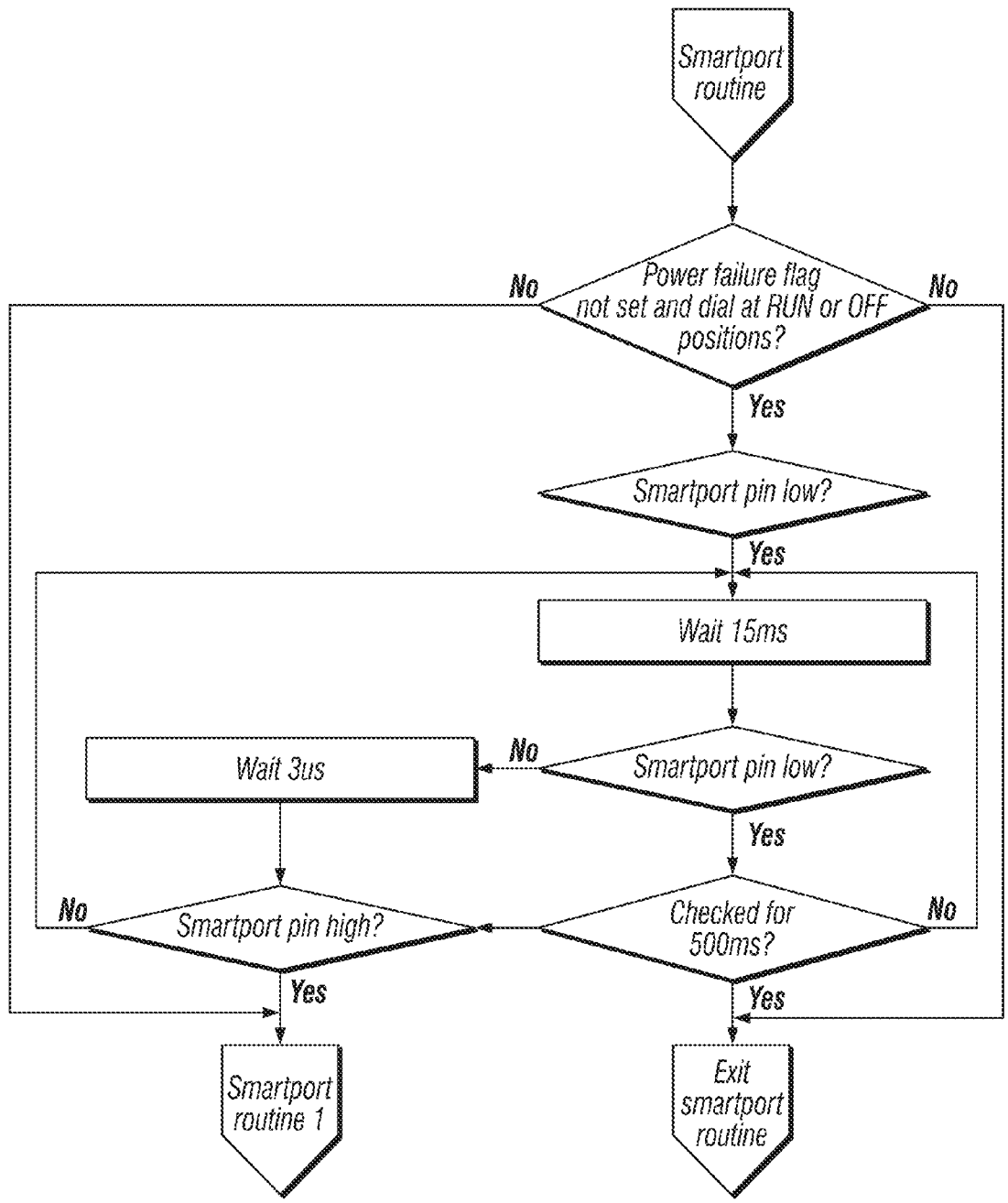
Figure 80:
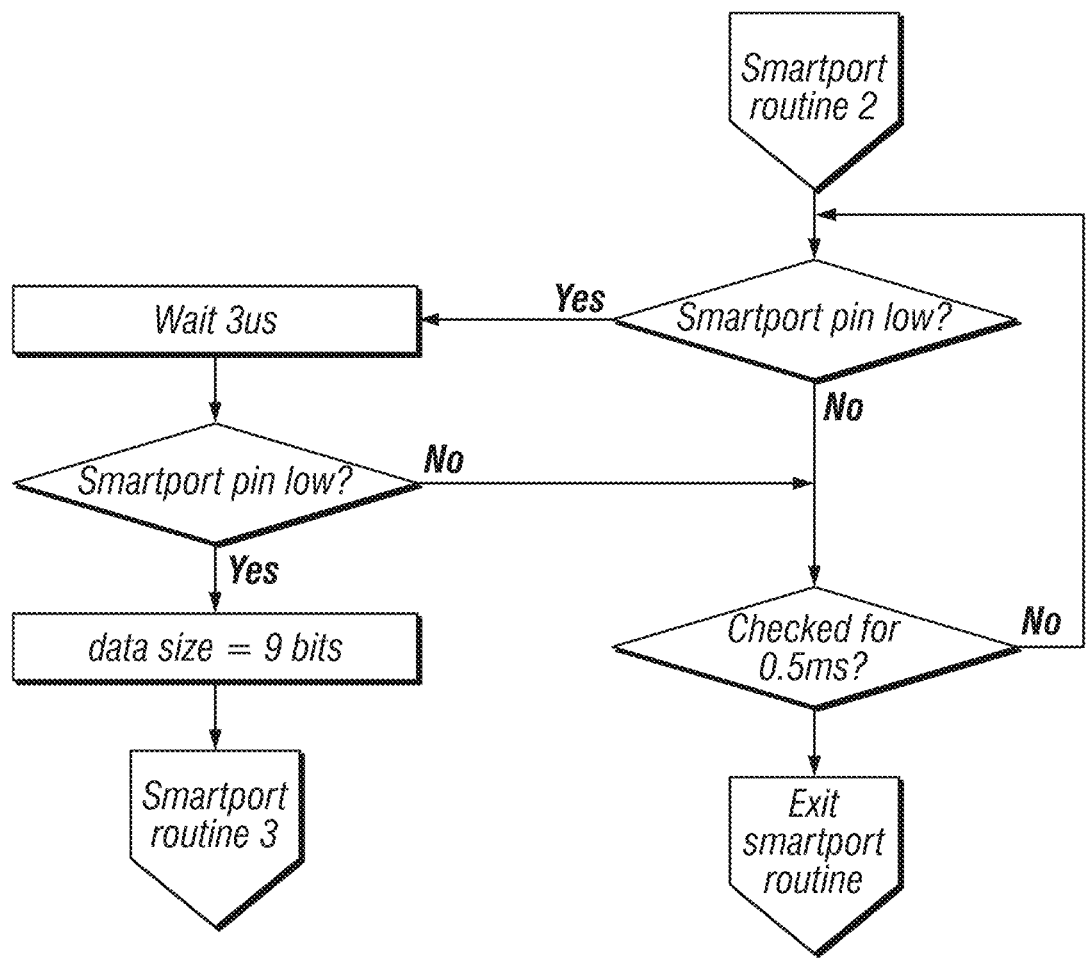
Figure 8P:
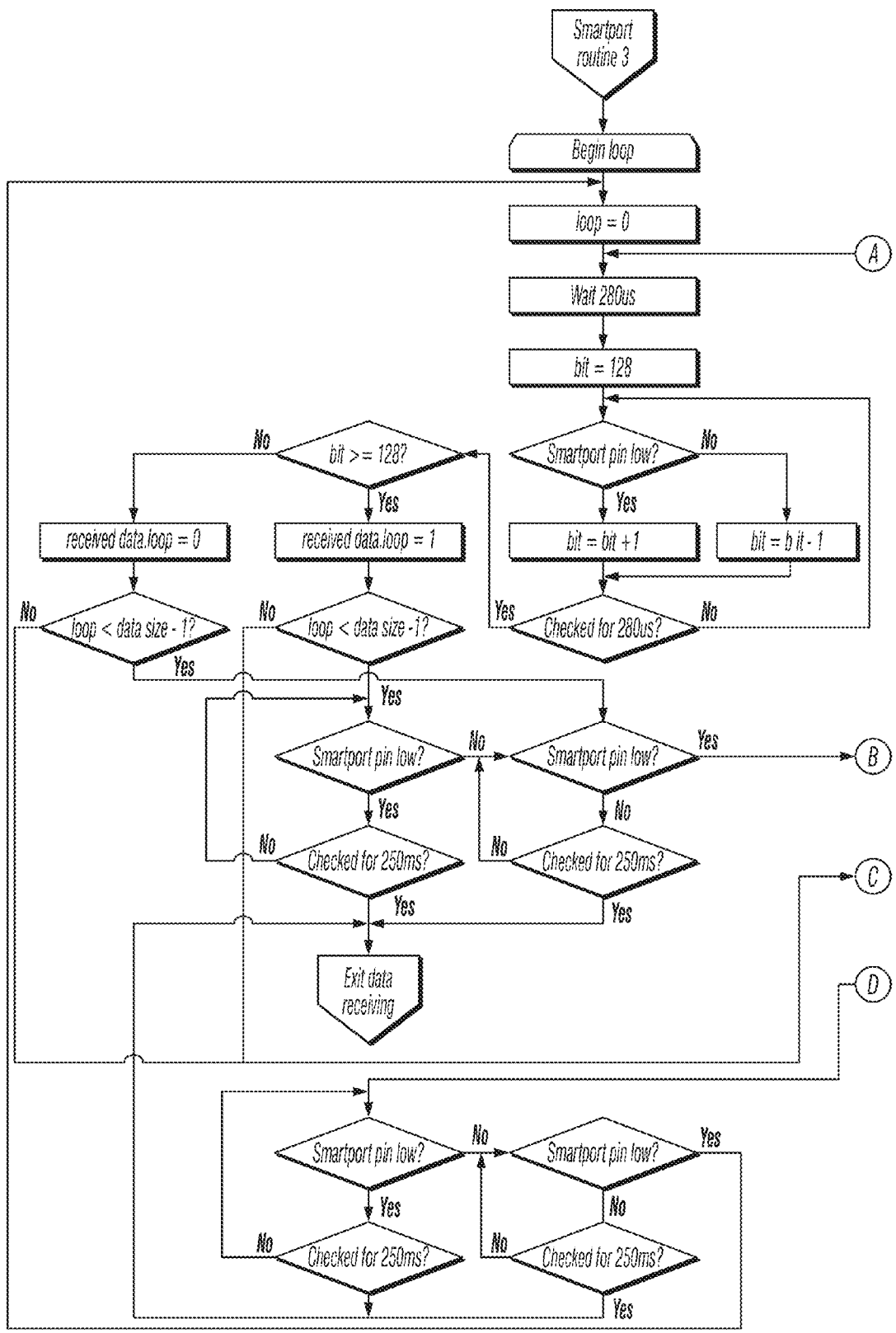
Figure 8P:
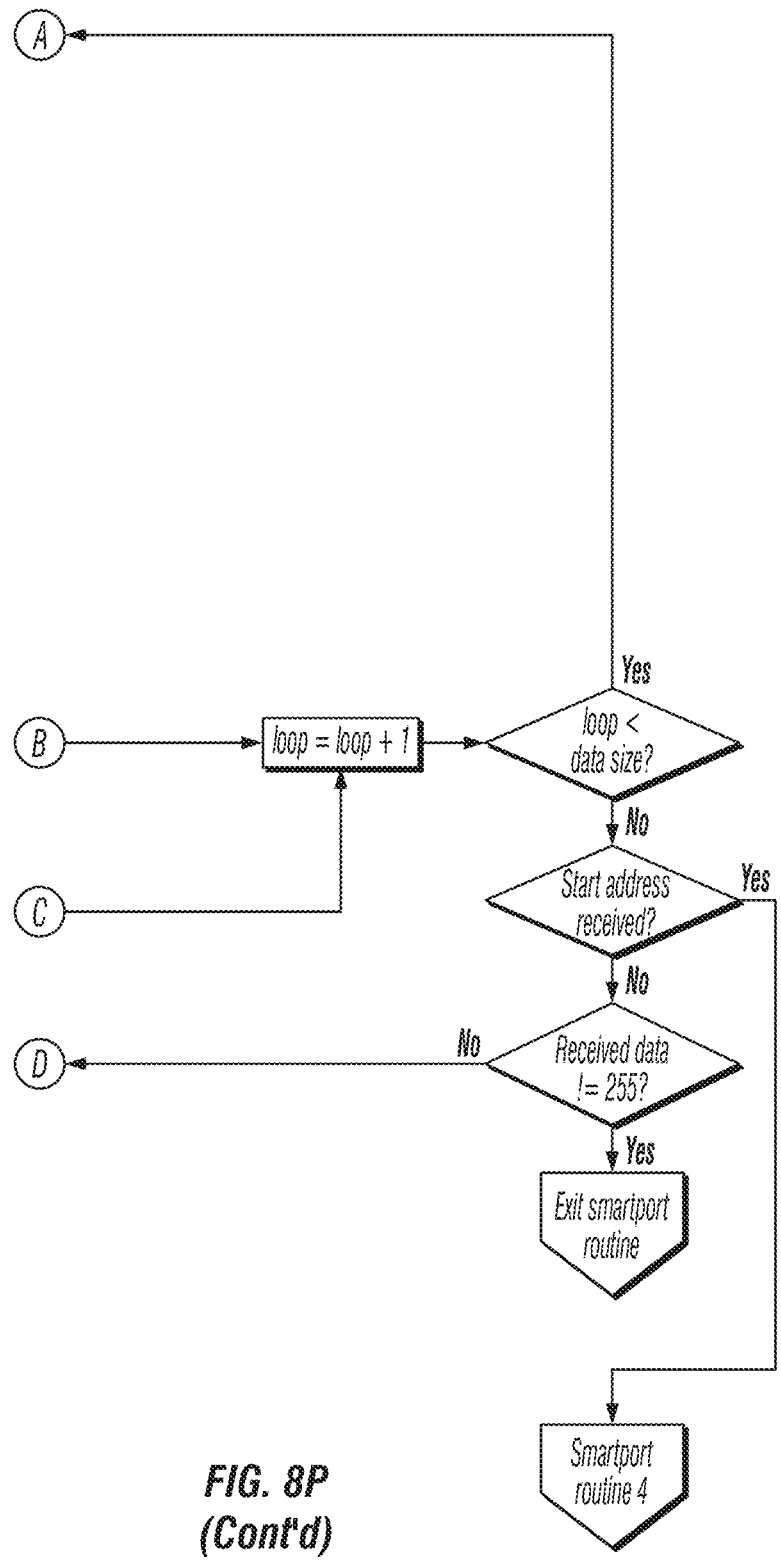
Figure 8Q:
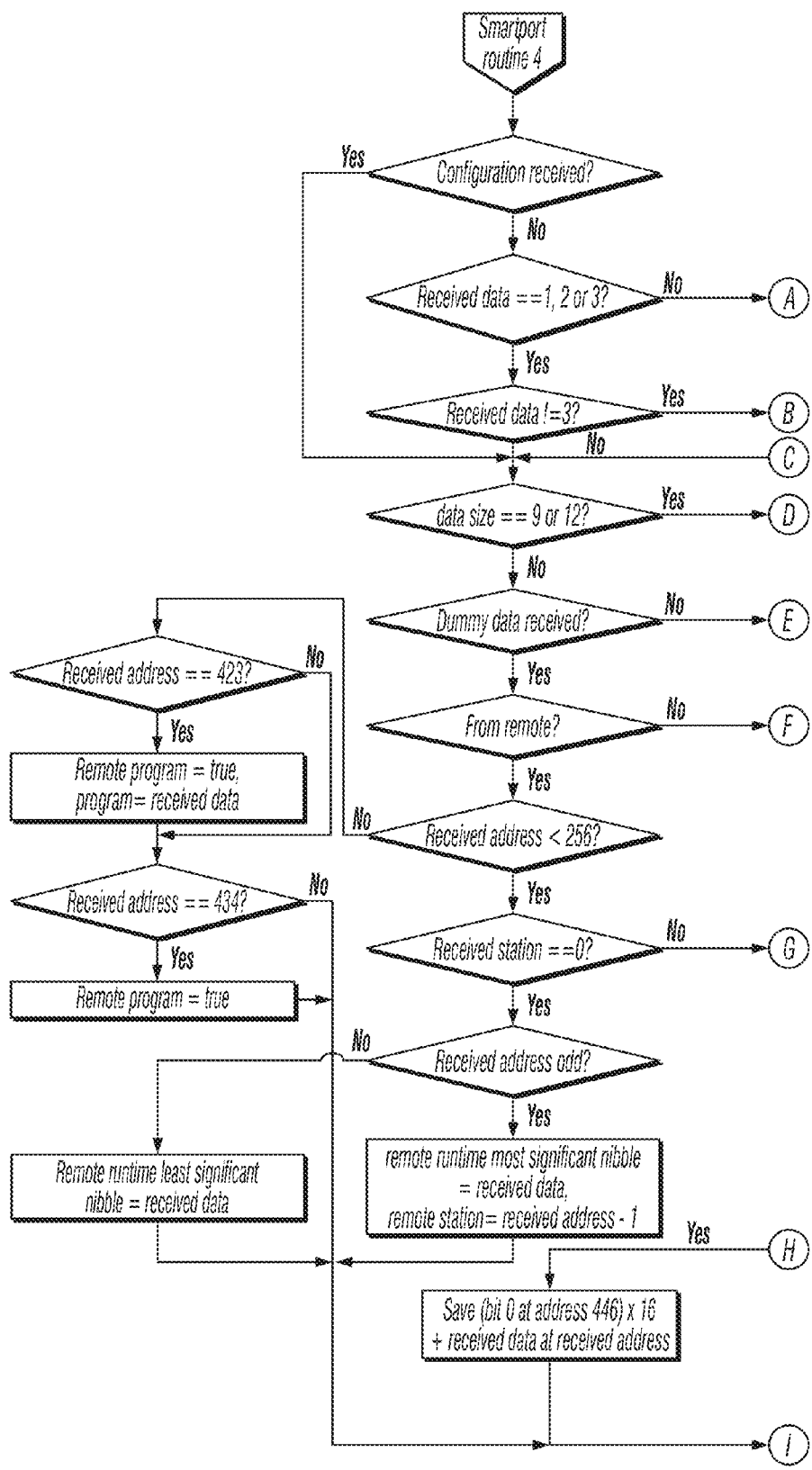
Figure 8Q:
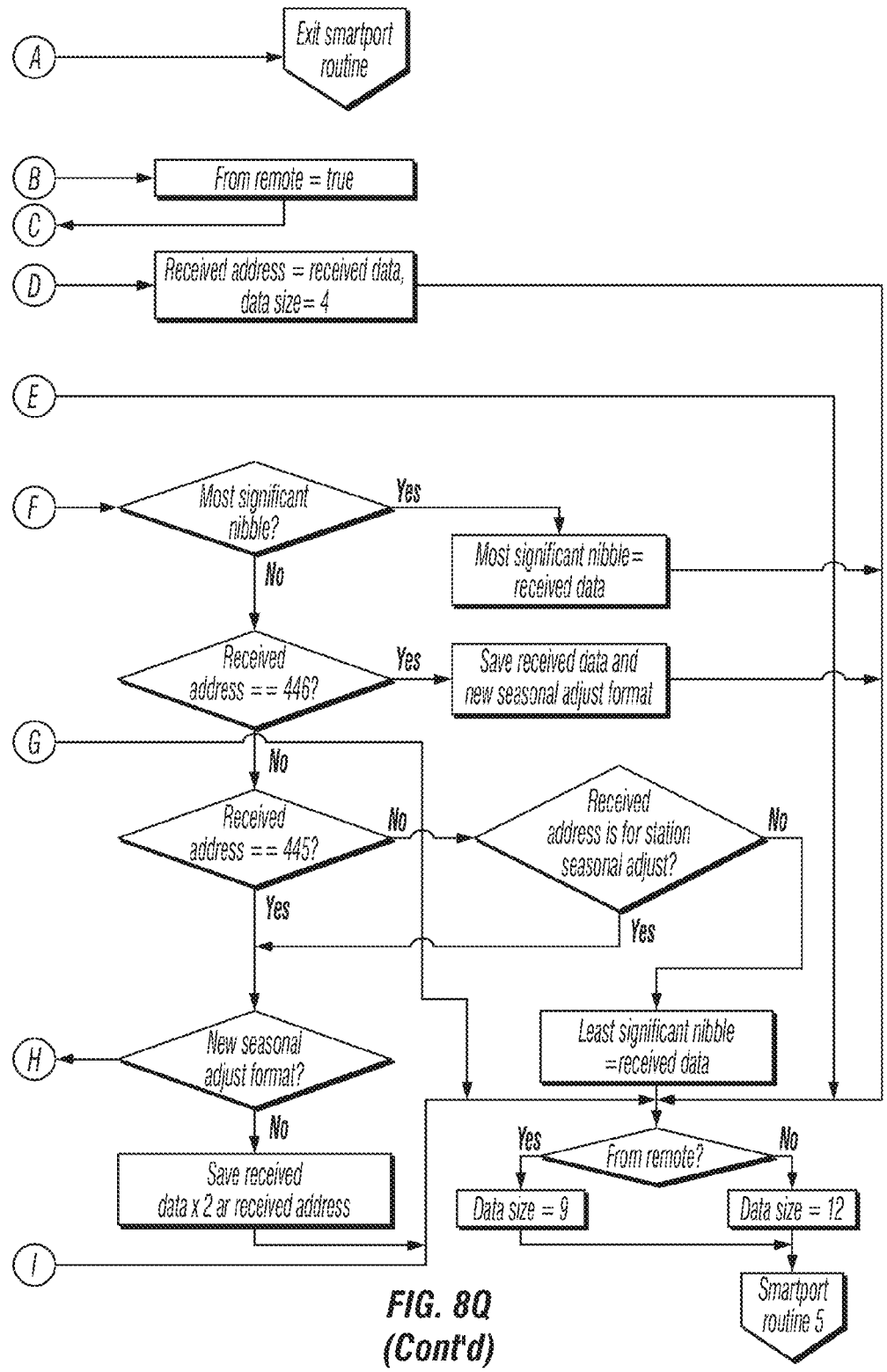
Figure 8R:
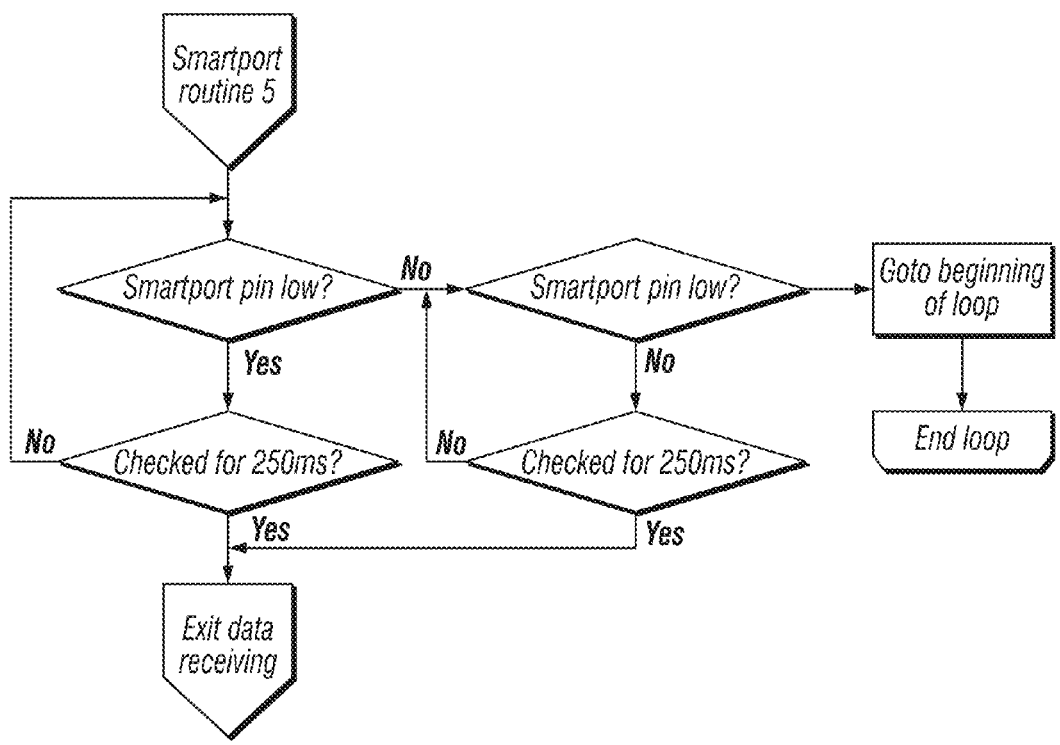
Figure 8S:
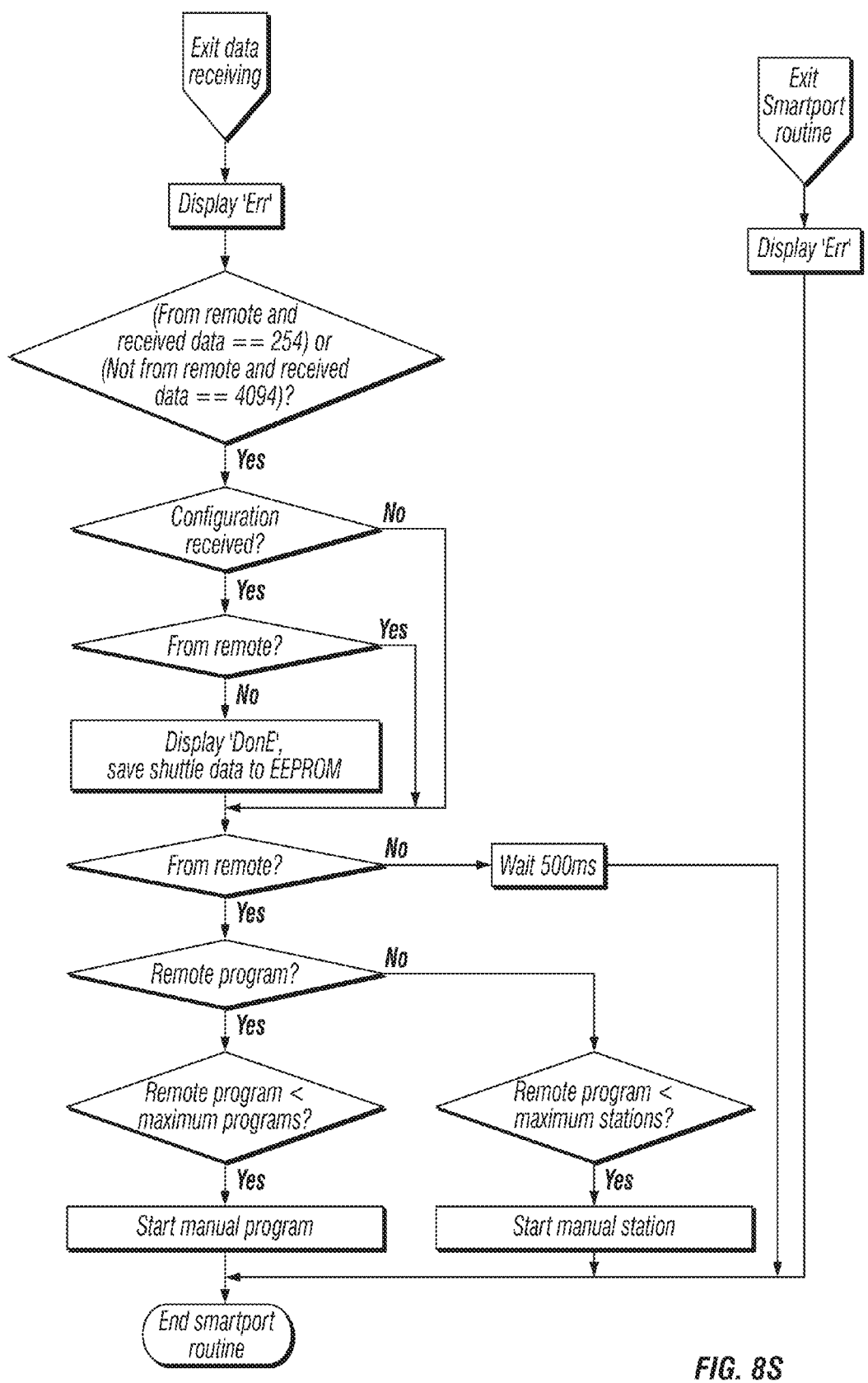
Figure 8T:
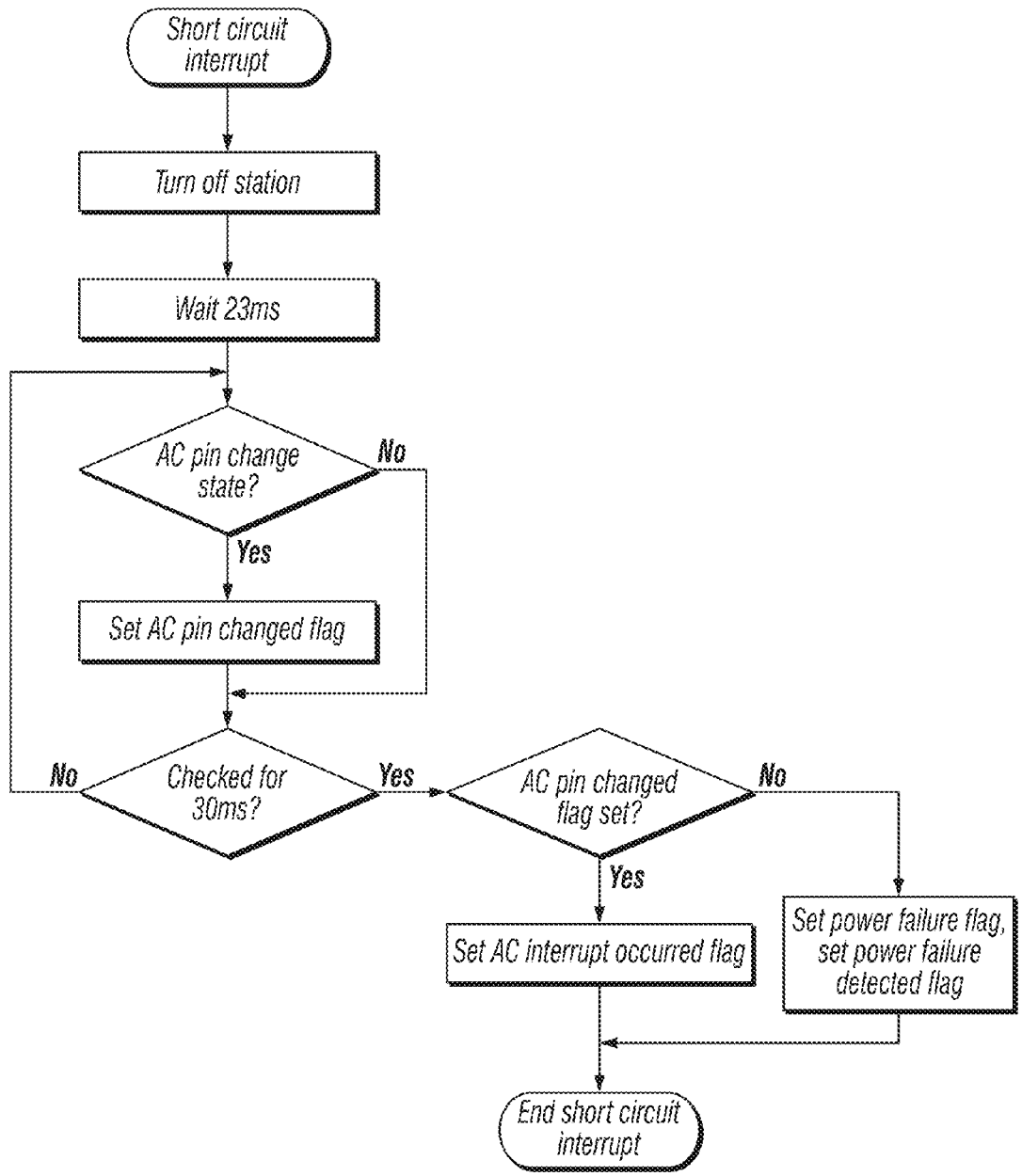
Figure 8U:
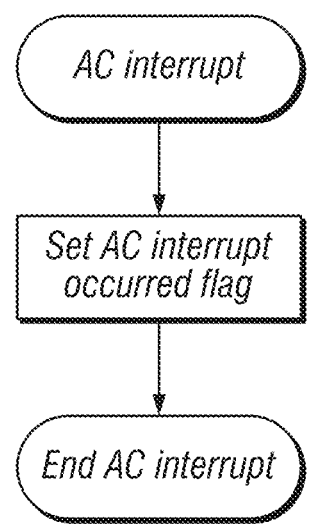
Figure 8V:
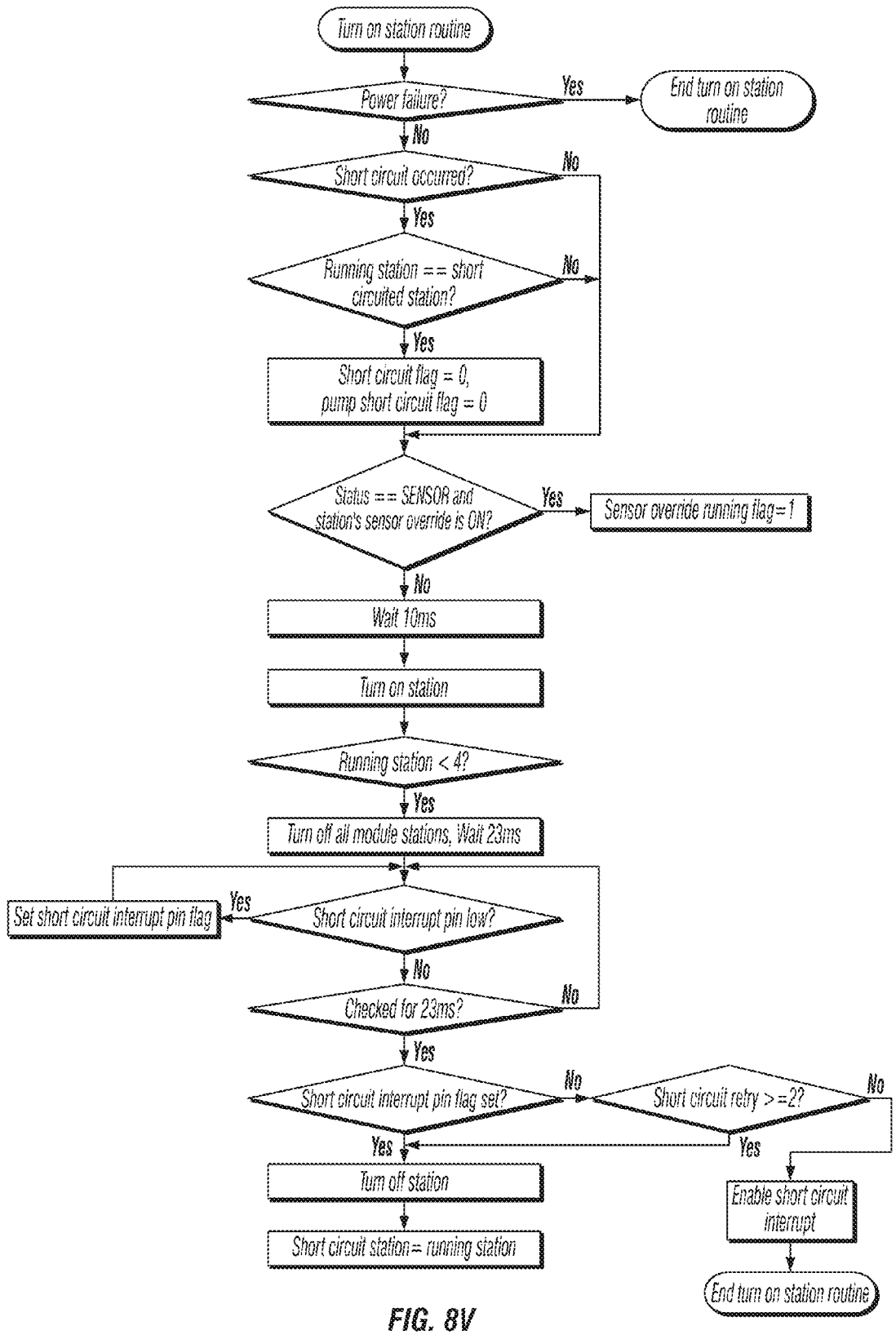
Figure 8W:
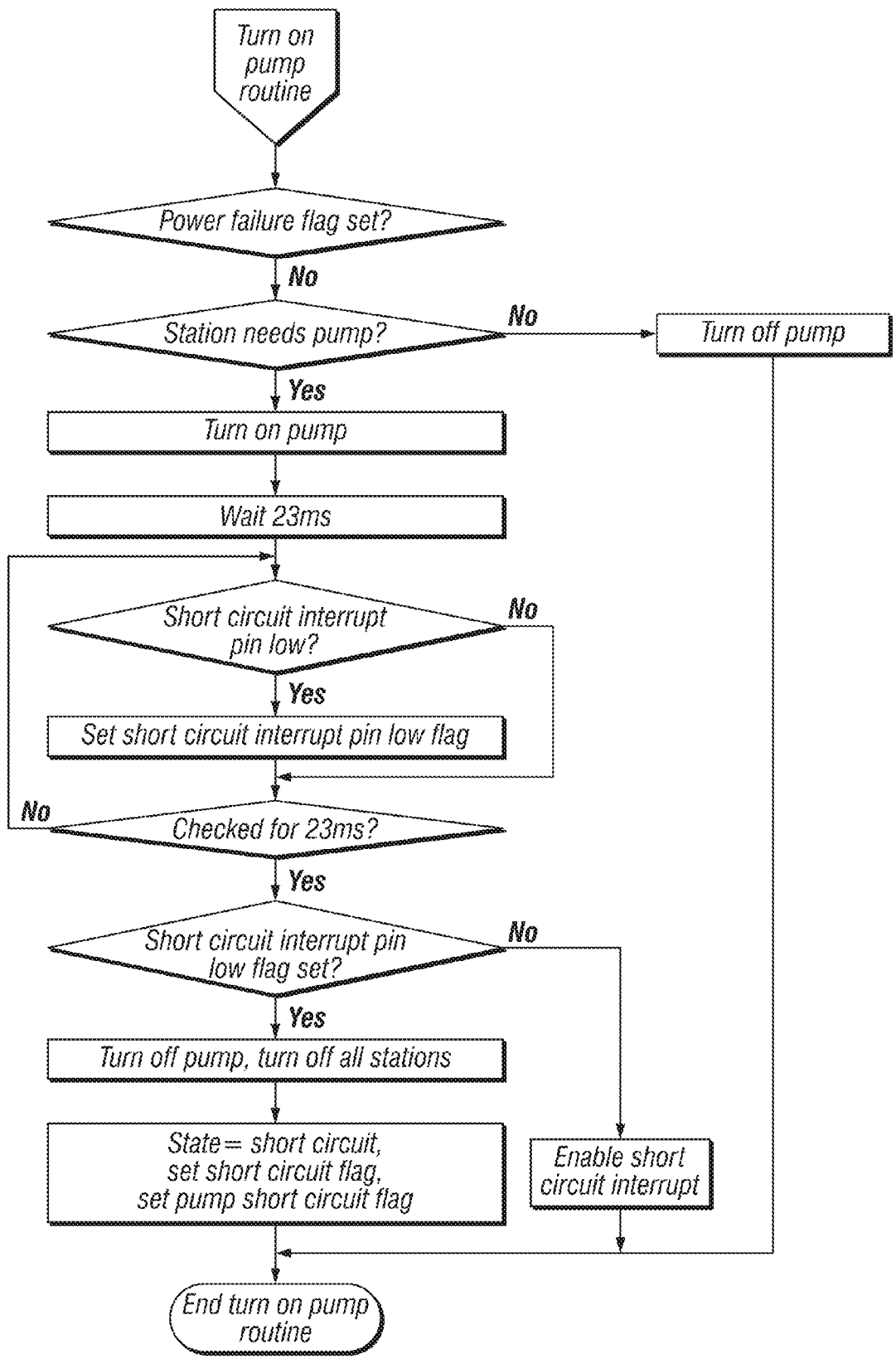

FIGS. 8A-8W are detailed flow diagrams illustrating the operation of the stand alone irrigation controller 12 of FIG. 2. Those skilled in the art of designing and programming irrigation controllers for residential and commercial applications will readily understand the logical flow and algorithms that permit the processor 40 to execute the watering program stored in the memory 42. This watering program enables the processor 40 to generate commands for selectively turning the plurality of valves ON and OFF in accordance with the selected or entered watering schedules. The watering program includes a seasonal adjustment feature that provides the capability for automatically modifying the watering schedules to thereby conserve water while maintaining plant health. By actuating one of the push buttons 32*c* or 32*d* the user can increase or decrease the run types for all stations by a selected scaling factor, such as ten percent, to account for seasonal variations in temperature and rainfall.

Figure 9:
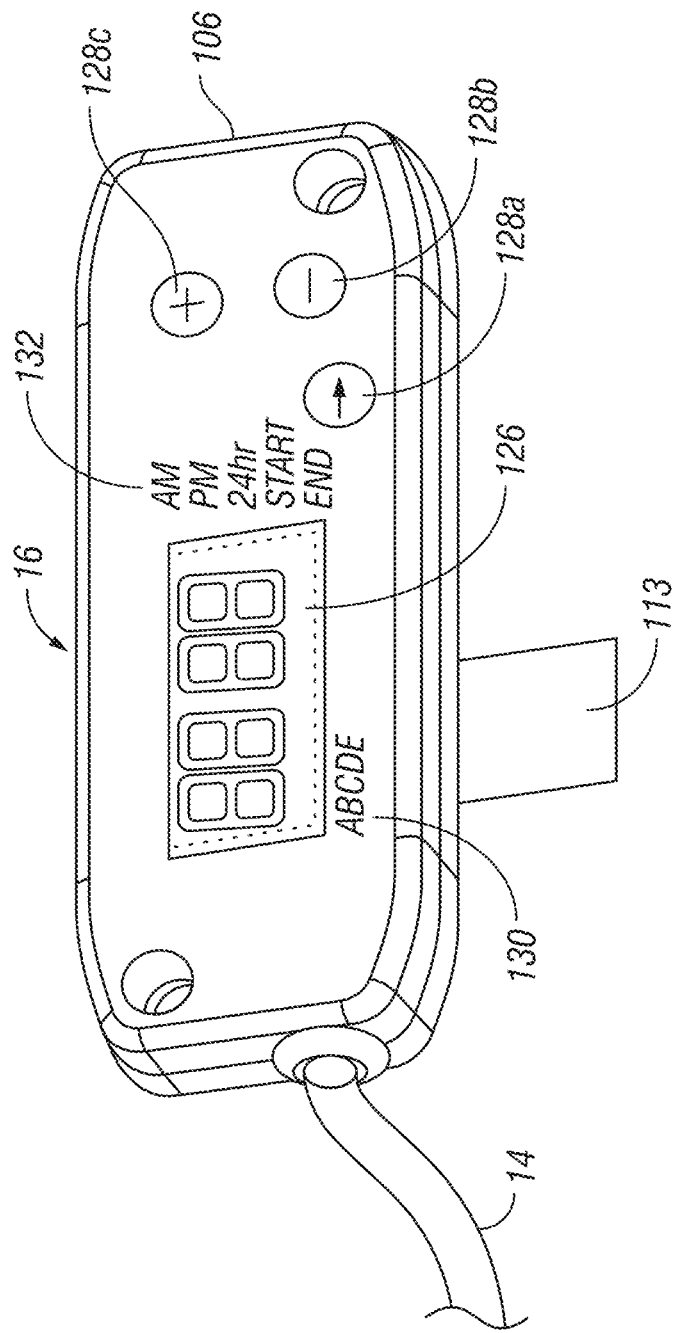
FIG. 9 is a perspective view of the stand alone soil moisture control unit of the system of FIG. 1.
Figure 10:
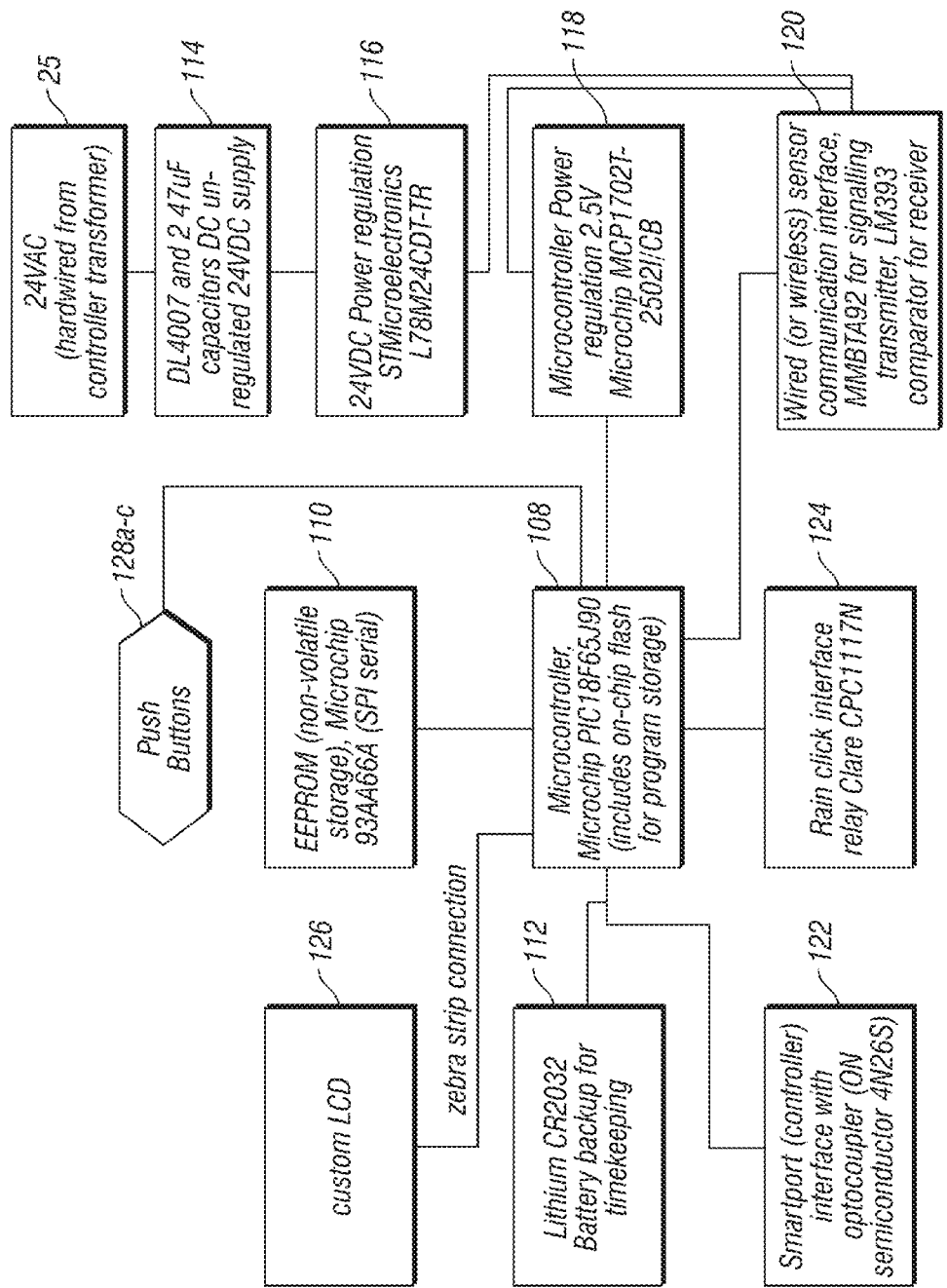
FIG. 10 is a block diagram of the electronic portion of the stand alone ET unit of FIG. 9.

Referring to FIG. 9, the stand alone soil moisture control unit 16 includes a rectangular outer plastic housing 106 enclosing a printed circuit board (not illustrated) which supports the electronic circuit of the soil moisture control unit 16 that is illustrated in the block diagram of FIG. 10. A microcontroller 108 such as a Microchip PIC18F65J90 processor executes firmware programming stored in a memory 110 such as an industry standard 93AA66A EEPROM memory. The microcontroller 108 can receive DC power from a lithium battery 112 such as an industry standard CR2032 battery, which allows accurate time keeping in the event of a power failure. Insulating strip 113 (FIG. 9) must be manually pulled out to establish an operative connection of the battery 112. External power for the soil moisture control unit 16 is supplied from the transformer 25 (FIG. 1) via the cable 14. The twenty-four volt AC power from the transformer 25 is supplied to a rectifier/filter circuit 114 (FIG. 10) which supplies twenty-four volt DC power to a power regulation circuit 116 which may be an ST Microelectronics L78M24CDT-TR regulator. Power from the power regulation circuit 116 is fed to a microcontroller power regulator 118 which may be a Microchip MCP 1702T-25021/CB regulator. Power from the power regulation circuit 116 is also fed to a wired or wireless sensor communications device 120 that may include, by way of example, an industry standard MMBTA92 for the signal transmitter and an industry standard LM393 comparator for the receiver.

The microcontroller 108 (FIG. 10) interfaces with the SmartPort (Trademark) connector of the irrigation controller 12 with a combination interface/optocoupler 122 which may be provided by an industry standard 4N26S device. The microcontroller 108 interfaces with a soil moisture sensor illustrated in FIG. 1. An LCD display 126 is mounted in the housing 106. Three manually actuable controls in the form of push buttons 128*a-c* (FIG. 9) are mounted in the housing 106 for enabling the user to make selections when setting up and modifying the operation of the Moisture sensor control unit 16 in conjunction with information indicated on the display 126 which is facilitated by column and row indicia 130 and 132, respectively, affixed to the housing 106 adjacent the horizontal and vertical margins of the display 126. Row indicia 132 include, from top to bottom, AM, PM, 24 hr, START and END which are printed, painted, molded or otherwise applied to the outer plastic housing such as by a sticker. Column indicia 130 are illustrated diagrammatically as A-E in FIG. 9 due to space constraints in the drawing. The soil moisture control unit 16 can be manufactured to work with a variety of different soil moisture sensors. Different sensors may have different set up requirements. As a result, A-E may be labeled differently depending on which type of sensor it is designed to control. The labels of A-E may be selected from, but not limited to the group consisting of; MOISTURE SENSOR TYPE, SOILTYPE, SENSOR DEPTH, TEMPERATURE SENSOR TYPE, CALIBRATION, CABLE LENGTH, SET THRESHOLD, NO WATER and WATER+/− with associated icons which are printed, painted, molded or otherwise applied to the outer plastic housing 106 such as by a sticker.

FIGS. 11A-11D is flow diagrams illustrating the operation of the stand alone soil moisture control unit 16. A watering schedule typically includes inputted parameters such as start times, run times and days to water. The soil moisture control unit 16 can automatically set the seasonal adjustment of the irrigation controller 12 to reduce watering time, or increase watering times, depending on the soil conditions at the time. The soil moisture control unit 16 utilizes actual soil moisture data as its basis for estimating a soil moisture requirement value and making the modifications to the watering schedules implemented by the irrigation controller 12. The soil moisture control unit is designed to work with one or more styles of moisture sensor. One example may be similar to U.S. Pat. No. 5,179,347 of Hawkins. Another example is illustrated in the method of sensing moisture described in publication number 20080202220 of Schmidt where ambient soil temperature and temperature degradation times are used to determine the soil moisture content. Other types of soil moisture sensors with or without temperature sensors may be used with various models of the soil moisture control unit. Sensors without temperature sensing capabilities can be used alone, or with optional temperature sensing devices that can be added during the installation. Temperature sensors may be placed in the ground or may be used to measure air temperature. If the installation includes the ability to measure the either the soil or the air temperature, this additional information can be used by the Soil Moisture Control Unit 16 to calculate the soil moisture requirement value. The soil moisture requirement value will increase or decrease in relationship to changes in the soil temperature or air temperature. The higher the recorded temperatures, the greater the evapotranspiriation of the plant material will be. Furthermore, overhead irrigation is not as efficient as high temperatures because of evaporation of the spray in the air prior to it hitting the surface of the ground. Also if the temperatures are very high, a certain percentage of water that hits the ground will evaporate prior to soaking into the soil. All of these considerations can be taken in to account by the soil moisture controller to increase or decrease the amount of water that is supplied at a given time. In the case of a soil temperature measurement, this is further modified by how deep the sensor is placed into the soil because the temperature changes in the soil are reduced as the sensing depth is increased. The ability of the soil moisture control unit 16 to determine the irrigation requirements based on either air or soil temperature and moisture content allow it to change the seasonal adjust of the irrigation controller 12 from as little as 0% of normal watering to more than 100% of the normal watering schedule based on the actual conditions of the soil at the irrigation site.

The user can modify the run and cycle times for individual stations in the usual manner in the irrigation controller 12. As an example, if one station is watering too much, but all of the other stations are watering the correct amount, the user can easily reduce the run time of that particular station and balance the system out. Then the soil moisture control unit 16 continues modifying the watering schedules executed by the irrigation controller 12 on a global basis as a percentage of run time, based on the calculated estimated soil moisture requirement value. Irrigation controllers can be used to control landscape lighting and other non-irrigation devices such as decorative water fountains. The controller 12 may have features in it such that the soil moisture control unit 16 only modifies the watering schedules of the irrigation controller 12.

One of the difficulties with conventional soil moisture based controllers is attributable to the difficulty of fine-tuning the irrigation controller schedule based on the soil moisture data being received. One situation is where the irrigation schedule has been inaccurately set up. It is very common for irrigation controllers to be programmed by the end user so that the schedule tends to over or under irrigate the property. In the new invention, this scheduling error is automatically corrected by the soil moisture control unit. When the irrigation control unit 16 is installed, the soil moisture sensor 20 is installed at the proper root zone depth of one of the irrigated zone. A wire connects the soil moisture control unit to the output of that zone on the irrigation controller. The soil moisture control unit 16 then measures how long that station operates. If the soil moisture control unit 16 has not detected the proper moisture when the irrigation cycle is complete, it can automatically increase the run time of the controller by adjusting the seasonal adjust feature higher. It will continue to do this over time until operation of that zone runs long enough for the soil moisture to sense the moisture in the soil. Also, if the soil moisture control unit 16 detects that the soil is moist, but the irrigation cycle is still running, it will allow that irrigation cycle to continue. After the cycle is complete, it will calculate the amount of time the zone ran and compare that with the amount of time it took to moisten the soil. It will then automatically reduce the seasonal adjust of the irrigation controller so the irrigation cycle time will match the amount of time required to irrigate the soil to the proper moisture. This is repeated each time the irrigation controller operates that zone to continually fine tune the watering schedule. Another situation is that the soil moisture sensors may not always be able to be placed in an optimum location on the irrigation site. As an example, a soil moisture sensor may be placed in an area that receives late afternoon shade. This will result in the calculation of an abnormally high estimated soil moisture content value for the rest of the irrigation site. The entire irrigation site may receive too little water and the plant material may become stressed from too little water if the watering schedules are based on an abnormally high estimated soil moisture content. If a conventional soil moisture based irrigation controller receives input from such an incorrectly located soil moisture sensor, the user can attempt to compensate by increasing the run times for each zone to compensate for the error. This is cumbersome and makes it difficult and frustrating for the user to adjust the conventional soil moisture based irrigation controller for optimum watering.

An advantage of the present invention is the ability to globally modify the watering schedules of the stand alone irrigation controller 12 to compensate for this type of condition. If at any time the user realizes that the property is receiving too little water, the user can simply manually change an overall watering adjustment feature. The overall watering adjustment feature is implemented as a simple plus or minus control via actuation of an assigned pair of the push buttons 128*a-c*. This changes the reference point of the soil moisture requirement calculation either up or down. After this adjustment is made, the seasonal adjustment executed by the soil moisture control unit 16 references the new setting and then compensates for under watering that would otherwise occur. Likewise, if the overall watering is too much for the irrigation site, the user can simply adjust the overall watering adjustment feature down and create a new lower reference for the automatic soil moisture based adjustments. The overall watering adjustment feature makes it easy for the user to fine-tune the system to the particular requirements of the irrigation site. The overall watering adjustment feature can be indicated by showing "global adjustment," or "more/less, water+/−," or similar naming conventions.

The overall watering adjustment feature of the soil moisture control unit 16 directly alters the station run times executed by the irrigation controller 12. This adjustment modifies a constant that is used in the calculating the seasonal adjust value. When the user makes overall watering adjustments by pressing plus or minus push buttons on the soil moisture control unit 16, this directly affects the soil moisture requirement value that is used to reset the seasonal adjustment in the host controller 12. In calculating the estimated soil moisture requirement value, the microcontroller 108 in the soil moisture control unit 16 uses only select data points as variables (soil moisture readings and optional temperature measurements) and uses other data points that may consist of pre-programmed constants, and/or data entered by the user that defines some one or more constants of the site.

Another feature provided by the soil moisture control unit 16 is an automatic shut down feature for irrigation that overrides any scheduled run times. The automatic shut down feature of the soil moisture control unit 16 can be utilized in geographic areas where watering agencies and municipalities impose restrictions that limit the times when irrigation can occur. The user is able to enter a no-water window into the soil moisture control unit 16, which consists of the times when irrigation is not allowed to take place. When a no-water window is entered by the user, the soil moisture control unit 16 will signal the irrigation controller 12 to shut down, irregardless of any scheduled irrigation running or not running at the time. The soil moisture control unit 16 will then allow the irrigation controller 12 to return to its normal run mode after the selected no-water window time has elapsed. The irrigation controller 12 may have sensor input terminals, as in the case of the Pro-C irrigation controller, which can be used to shut down all watering on receipt of a shut down command from the soil moisture control unit 16.

In conclusion, the soil moisture control unit 16 of the present invention utilizes the watering program set up procedures that the users are already accustomed to. Start times, station run times, and days-to-water are manually entered into the irrigation controller 12. The user also selects from one of a group selected sensors in the soil moisture control unit 16. The ET unit 16 then automatically takes over setting of the seasonal adjustment feature of the irrigation controller 12 on a regular basis. Instead of a user changing that feature several times per year, the soil moisture control unit 16 sets that seasonal adjustment daily depending on current soil conditions gathered on site. Furthermore, the soil moisture control unit 16 shuts down any scheduled watering by the irrigation controller 12 when there is a scheduled no-water window to comply with local agency regulations.

The present invention also provides a unique method of controlling a plurality of valves on an irrigation site. The method includes the steps of selecting and/or creating a watering schedule, storing the watering schedule and generating a signal representative of the soil condition on an irrigation site. The method also includes the steps of calculating an estimated soil moisture requirement value based at least in part on the signal and selectively turning a plurality of valves located on the irrigation site ON and OFF in accordance with the watering schedule. Importantly, the method includes the further step of automatically modifying the watering schedule based on the estimated soil moisture requirement value using a seasonal adjust algorithm to thereby conserve water while maintaining the health of plants on the irrigation site. Optionally, the method of present invention may further include the step of inputting an overall watering adjustment and automatically modifying the watering schedule through the seasonal adjust algorithm based on the estimated soil moisture requirement value as increased or decreased by the inputted overall watering adjustment.

Figure 12:
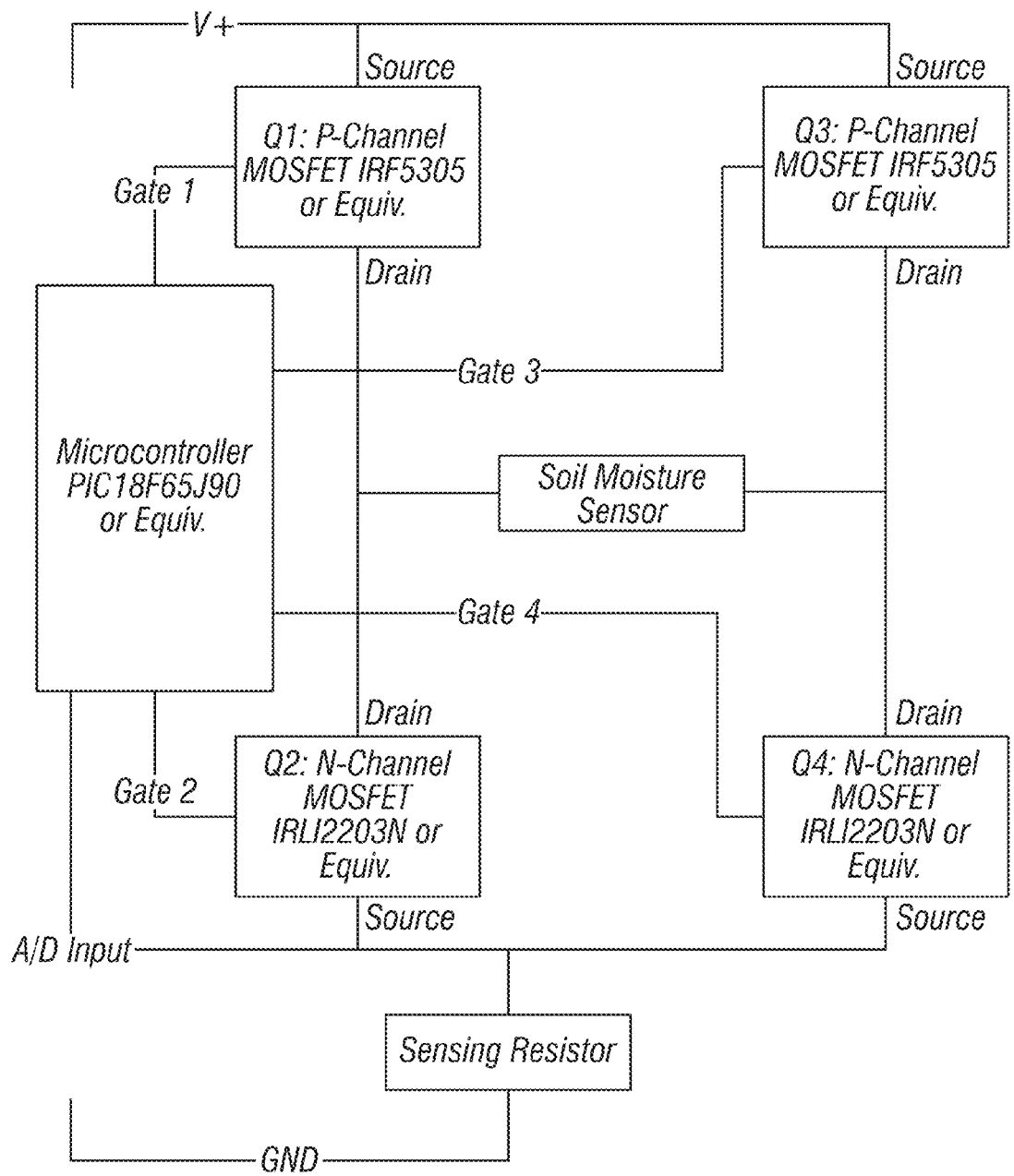
FIG. 12 is a schematic diagram of an interface circuit for use with a resistive soil moisture sensor.
Figure 13:
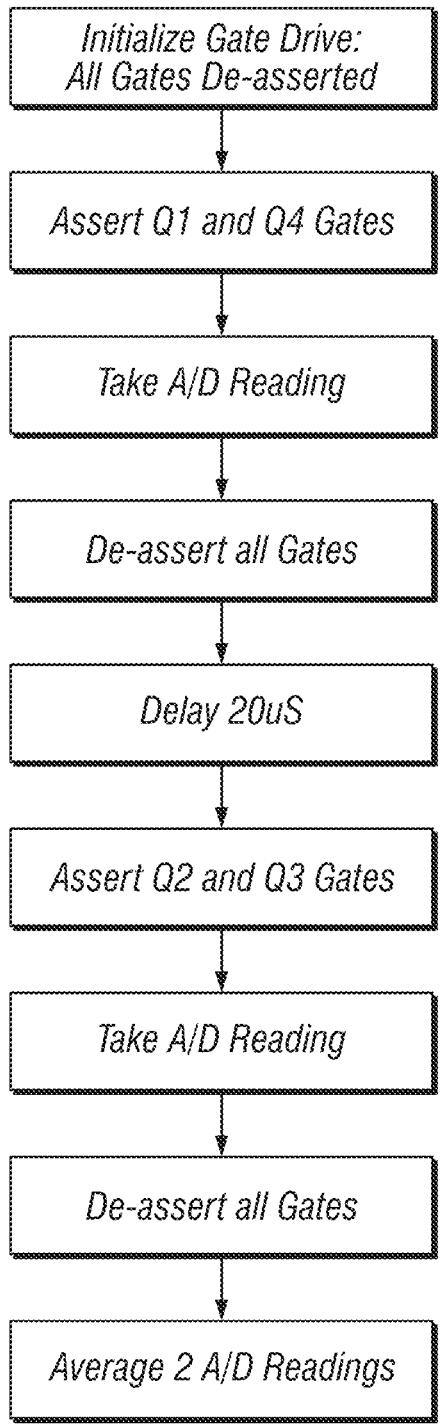
FIG. 13 is a flow diagram illustrating the operation of the interface circuit of FIG. 12.

While the a soil moisture sensor of any type can be combine with some intelligence (microcontroller) at the sensor itself, and made to communicate with the control unit via the MMBTA92 and LM393 as discussed earlier, it may be more cost effective to deal with the "raw" sensor interface, than to add this intelligence in every sensor. An example of this approach for a resistive soil moisture sensor is illustrated in FIGS. 12 and 13.

This type of sensor varies its resistance based on the amount of moisture in the soil. It is very important that there be no DC potential between any metallic part of the sensor, and earth ground. If such a potential exists, the sensor will disintegrate due to the well known process of galvanic corrosion. Referring to FIG. 12, and the flowchart of FIG. 13, it will be understood that first transistors Q1 and Q4 turn ON, and the resistance of the sensor is measured using the sensing resistor and an A/D input of the microcontroller. Then, Q1 and Q4 are turned OFF and transistors Q2 and Q3 are turned ON and the measurement repeated. Both readings should be about the same, but are averaged to increase accuracy. During the first measurement, a DC voltage of one polarity is applied to the sensor. During the second measurement, and opposite polarity DC voltage is applied to the sensor, thus the time-average DC voltage that the sensor sees is zero. Furthermore, during the vast majority of the time, when no readings are being taken, all transistors are OFF and there is no potential on the sensor. This approach eliminates the Galvanic corrosion that would otherwise occur.

The relationship of resistance to soil moisture is typically non-linear, thus the microcontroller can apply a polynomial expansion, or lookup table function to determine the amount of moisture in the soil from the resistance reading.

While an embodiment of an irrigation system comprising a stand alone soil moisture control unit connected to stand alone irrigation controller and linked to a separate soil moisture sensor has been described in detail, persons skilled in the art will appreciate that the present invention can be modified in arrangement and detail. The features and functionality described could be provided by combining the irrigation controller and the ET unit into a single integrated unit in which case a single microcontroller would replace the microcontrollers 40 and 108. Alternatively, the soil moisture control unit could be packaged in a soil moisture control module designed for removable insertion into a receptacle in a stand alone irrigation controller. The irrigation controller may be mounted outside, or be connected directly to 110 or 220 AC power with a transformer mounted inside the irrigation controller. Therefore, the protection afforded the subject invention should only be limited in accordance with the scope of the following claims.

What is claimed is:

1. A soil moisture based irrigation system, comprising:
a stand alone irrigation controller comprising
a control panel including a display and a plurality of user inputs that enable a user to enter a watering schedule including a run time, and to manually adjust a percentage adjustment value of a percentage adjustment feature;
a computer processor operatively connected to the control panel;
a memory connected to the computer processor, said computer processor configured to execute programs stored in the memory;
a plurality of switches operatively connected to the computer processor for turning a power signal ON and OFF to a plurality of valves that deliver water to a plurality of sprinklers; and
programming stored in the memory to accept input from the user via the plurality of user inputs to implement the watering schedule, wherein during said run time, the computer processor operates ones of the plurality of switches to turn the power signal ON to one or more of the plurality of valves thereby delivering the water to ones of the sprinklers to irrigate an irrigation site, the programming further accepting input from the user via the plurality of user inputs to implement the percentage adjustment feature to increase or decrease the run time of the watering schedule by the percentage adjustment value;
at least one soil moisture sensor; and
a stand alone soil moisture control unit different from and operatively in communication with the stand alone irrigation controller and the at least one soil moisture sensor, the stand alone soil moisture control unit installed on the irrigation site and comprising a memory storing programming that calculates a soil moisture requirement value using a signal from the at least one soil moisture sensor and communicates a soil moisture adjustment value responsive to the soil moisture requirement value to the computer processor of the stand alone irrigation controller to automatically increase or decrease the percentage adjustment value of the percentage adjustment feature, the percentage adjustment feature configured to change the watering schedule by said percentage adjustment value.

2. The system of claim 1 wherein the programming of the stand alone soil moisture control unit provides the capability to automatically modify the watering schedule through the percentage adjustment feature based on the soil moisture requirement value as increased or decreased by the user through an inputted separate overall watering adjustment.

3. The system of claim 1 wherein the programming of the soil moisture control unit provides the capability to enter a no-water window to automatically override the watering schedule.

4. The system of claim 1 further comprising a temperature sensor, wherein the soil moisture requirement value is calculated using signals from the at least one soil moisture sensor and the temperature sensor.

5. The system of claim 1 wherein the stand alone soil moisture control unit is operatively connected to the at least one soil moisture sensor through a wireless communications link.

6. The system of claim 1 wherein the stand alone soil moisture control unit is configured to receive power from the stand alone irrigation controller.

7. The system of claim 1 wherein the stand alone soil moisture control unit is configured to modify the watering schedule of the stand alone irrigation controller through a data port of the stand alone irrigation controller.

8. The system of claim 1 wherein the stand alone soil moisture control unit includes manually actuable controls configured to enable the user to input an overall watering adjustment by selectively increasing and decreasing a reference point, the memory storing programming that calculates the soil moisture requirement value using the signal from the at least one soil moisture sensor and the overall watering adjustment.

9. The system of claim 1 further comprising a control unit housing housing said stand alone soil moisture control unit.

10. The system of claim 9 wherein said control unit housing comprises a handheld housing.

11. The system of claim 9 wherein said control unit housing is mountable to a housing of said stand alone irrigation controller.

12. The system of claim 1 wherein the soil moisture adjustment value comprises a percentage.

13. A soil moisture based irrigation system, comprising:
an interface including a display and a plurality of user inputs that enables a user to enter a watering schedule including a run time and to manually adjust a percentage adjustment value of a percentage adjustment feature;
a computer processor operatively connected to the interface;
a memory operatively connected to the computer processor to store the watering schedule, said computer processor configured to execute programs stored in the memory;
a plurality of switches operatively connected to the computer processor and configured to turn a power signal ON and OFF to a plurality of valves that deliver water to a plurality of sprinklers;
at least one sensor configured to generate a signal representative of a soil condition, the computer processor configured to calculate a soil moisture requirement value based at least in part on the signal from the at least one sensor and to determine a soil moisture adjustment value responsive to the soil moisture requirement value; and
programming stored in the memory to accept input from the user via the plurality of user inputs to implement the watering schedule, wherein during said run time, the computer processor operates ones of the plurality of switches to turn the power signal ON to one or more of the plurality of valves thereby delivering the water to ones of the sprinklers to irrigate an irrigation site, the programming further accepting input from the user via the user inputs to implement said percentage adjustment feature to increase or decrease the run time of the watering schedule by the percentage adjustment value, the programming automatically increasing or decreasing said percentage adjustment value of the percentage adjustment feature based on the soil moisture adjustment value, said percentage adjustment feature configured to change said run time of said watering schedule by said percentage adjustment value.

14. The system of claim 13 wherein the interface further enables the user to input an overall watering adjustment, the computer processor further configured to calculate the soil moisture requirement value based at least in part on the signal from the at least one sensor and the overall watering adjustment.

15. The system of claim 13 wherein the programming calculates the soil moisture requirement value based on the signal from the at least one sensor and a plurality of pre-programmed constants, wherein data entered by the user determines at least one pre-programmed constant.

16. The system of claim 13 wherein the programming calculates the soil moisture requirement value based on the signal from the at least one sensor and a plurality of preprogrammed constants.

17. The system of claim 13 wherein the interface includes manually actuable switches to selectively increase and decrease the soil moisture requirement value.

18. The system of claim 13 wherein the soil moisture adjustment value comprises a percentage.

19. A method of controlling a plurality of valves on an irrigation site, the method comprising:
accepting inputs from a user that enable the user to enter a watering schedule including a run time, and to manually adjust a percentage adjustment value of a percentage adjustment feature;
storing the watering schedule;
selectively turning a power signal ON to a plurality of valves that deliver water to a plurality of sprinklers located on an irrigation site in accordance with the watering schedule;
implementing said percentage adjustment feature to increase or decrease the run time of the watering schedule by the percentage adjustment value;
receiving a signal representative of a soil condition on the irrigation site;
calculating a soil moisture requirement value based at least in part on the signal;
determining a soil moisture adjustment value responsive to the soil moisture requirement value; and
automatically increasing or decreasing said percentage adjustment value of the percentage adjustment feature based on the soil moisture adjustment value, said percentage adjustment feature configured to change said watering schedule by said percentage adjustment value.

20. The method of claim 19 further comprising inputting an overall watering adjustment and calculating the soil moisture requirement value based at least in part on the signal and the overall watering adjustment.

21. The method of claim 19 wherein the soil moisture requirement value is calculated based on the signal from a soil moisture measurement device and a plurality of predetermined constants.

22. The method of claim 19 wherein the soil moisture requirement value is calculated based on signals generated by a soil moisture sensor and a temperature sensor located on the irrigation site, and a plurality of predetermined constants.

23. The method of claim 22 wherein signals generated by the soil moisture sensor and the temperature sensor are transmitted wirelessly across the irrigation site.

24. The method of claim 19 wherein the soil moisture requirement value is calculated based on the signal and a plurality of predetermined constants, wherein data entered by the user determines at least one predetermined constant.

25. The method of claim 19 wherein the soil moisture requirement value is calculated based on signals generated by a soil moisture sensor and a temperature sensor located on the irrigation site, and a plurality of predetermined constants, wherein data entered by the user determines at least one predetermined constant.

26. The method of claim 19 wherein the soil moisture adjustment value comprises a percentage.

* * * * *